US012512028B2

(12) United States Patent
Cai et al.

(10) Patent No.: US 12,512,028 B2
(45) Date of Patent: Dec. 30, 2025

(54) SCAN CIRCUIT, ARRAY SUBSTRATE, AND DISPLAY APPARATUS

(71) Applicants: Chengdu BOE Optoelectronics Technology Co., Ltd., Sichuan (CN); BOE Technology Group Co., Ltd., Beijing (CN); Beijing BOE Technology Development Co., Ltd., Beijing (CN)

(72) Inventors: Wenzhe Cai, Beijing (CN); Jia Liu, Beijing (CN); Cong Fan, Beijing (CN); Rong Wang, Beijing (CN); Yao Huang, Beijing (CN); Xiangdan Dong, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 120 days.

(21) Appl. No.: 18/689,654

(22) PCT Filed: Apr. 28, 2023

(86) PCT No.: PCT/CN2023/091554

§ 371 (c)(1), (2) Date: Mar. 6, 2024

(87) PCT Pub. No.: WO2024/221400

PCT Pub. Date: Oct. 31, 2024

(65) Prior Publication Data

US 2025/0225900 A1 Jul. 10, 2025

(51) Int. Cl.
*G09G 3/20* (2006.01)

(52) U.S. Cl.
CPC ....... *G09G 3/20* (2013.01); *G09G 2300/0426* (2013.01); *G09G 2310/08* (2013.01)

(58) Field of Classification Search
CPC ............. G09G 3/20; G09G 2300/0426; G09G 2310/08
See application file for complete search history.

(56) References Cited

U.S. PATENT DOCUMENTS

2001/0030323 A1 10/2001 Ikeda
2004/0026723 A1* 2/2004 Miyazawa ........... G09G 3/3233 257/277

(Continued)

FOREIGN PATENT DOCUMENTS

CN 103927965 A 7/2014
CN 110415648 A 11/2019

(Continued)

OTHER PUBLICATIONS

International Search Report & Written Opinion mailed Dec. 18, 2023, regarding PCT/CN2023/091554.

*Primary Examiner* — Sejoon Ahn
(74) *Attorney, Agent, or Firm* — Intellectual Valley Law, P.C.

(57) ABSTRACT

A scan circuit is provided. The scan circuit includes a plurality of scan units. A respective scan unit of the plurality of scan units includes a plurality of transistors. A respective gate electrode of a respective transistor of the plurality of transistors includes a first portion and a second portion in different layers. First portions of respective gate electrodes of the plurality of transistors in the respective scan unit are configured to be provided with a power supply signal. Second portions of the respective gate electrodes of the plurality of transistors in the respective scan unit are configured to be provided with gate scanning signals, respectively. First portions of gate electrodes of at least two transistors in the respective scan unit are parts of a unitary structure.

17 Claims, 19 Drawing Sheets

(56) References Cited

U.S. PATENT DOCUMENTS

| | | | | |
|---|---|---|---|---|
| 2004/0095298 | A1* | 5/2004 | Miyazawa | G09G 3/3233<br>345/80 |
| 2004/0095338 | A1* | 5/2004 | Miyazawa | G09G 3/325<br>345/204 |
| 2004/0183515 | A1* | 9/2004 | Ota | G05F 3/267<br>323/315 |
| 2007/0018628 | A1* | 1/2007 | Akashi | H02M 3/1588<br>323/284 |
| 2007/0085153 | A1* | 4/2007 | Kalpat | H03L 7/0995<br>438/286 |
| 2008/0062092 | A1* | 3/2008 | Kanda | G09G 3/3233<br>345/77 |
| 2013/0277676 | A1 | 10/2013 | Yamazaki | |
| 2015/0171115 | A1 | 6/2015 | Yamazaki et al. | |
| 2016/0042691 | A1 | 2/2016 | Na et al. | |
| 2017/0294497 | A1 | 10/2017 | Lius et al. | |
| 2020/0194594 | A1 | 6/2020 | Ko et al. | |
| 2022/0302240 | A1 | 9/2022 | Zhang et al. | |
| 2022/0367730 | A1 | 11/2022 | Qian et al. | |

FOREIGN PATENT DOCUMENTS

| | | | |
|---|---|---|---|
| CN | 111755464 | A | 10/2020 |
| CN | 112639952 | A | 4/2021 |
| CN | 114744014 | A | 7/2022 |
| CN | 115798413 | A | 3/2023 |
| JP | 2016174176 | A | 9/2016 |

* cited by examiner

SCAN CIRCUIT, ARRAY SUBSTRATE, AND DISPLAY APPARATUS

CROSS-REFERENCE TO RELATED APPLICATION

This application is a national stage application under 35 U.S.C. § 371 of International Application No. PCT/CN2023/091554, filed Apr. 28, 2023, the contents of which are incorporated by reference in the entirety.

TECHNICAL FIELD

The present invention relates to display technology, more particularly, to a scan circuit, an array substrate, and a display apparatus.

BACKGROUND

Image display apparatuses include a driver for controlling image display in each of a plurality of pixels. The driver is a transistor-based circuit including a gate driving circuit and a data driving circuit. The gate driving circuit is formed by cascading multiple units of shift register units. Each shift register unit outputs a gate driving signal to one of a plurality of gate lines. The gate driving signals from the gate driving circuit scan through gate lines row by row, controlling each row of transistors to be in on/off states. The gate drive circuit can be integrated into a gate-on-array (GOA) circuit, which can be formed directly in the array substrate of the display panel.

SUMMARY

In one aspect, the present disclosure provides a scan circuit, comprising a plurality of scan units; wherein a respective scan unit of the plurality of scan units comprises a plurality of transistors; a respective gate electrode of a respective transistor of the plurality of transistors comprises a first portion and a second portion in different layers; first portions of respective gate electrodes of the plurality of transistors in the respective scan unit are configured to be provided with a power supply signal; second portions of the respective gate electrodes of the plurality of transistors in the respective scan unit are configured to be provided with gate scanning signals, respectively; and first portions of gate electrodes of at least two transistors in the respective scan unit are parts of a unitary structure.

Optionally, the first portions of the gate electrodes of the at least two transistors in the respective scan unit are connected to a same power supply signal line.

Optionally, first portions of gate electrodes of the plurality of transistors in the respective scan unit are parts of a unitary structure.

Optionally, first portions of gate electrodes of the plurality of transistors in the respective scan unit are connected to a same power supply signal line.

Optionally, first portions of gate electrodes of the plurality of transistors are in a same layer as at least one capacitor electrode of one or more capacitors in the respective scan unit.

Optionally, the plurality of transistors are a plurality of n-type transistors.

Optionally, active layers of the plurality of transistors in the respective scan unit are in a layer on a side of the first portions away from a base substrate; and the second portions are in a layer on a side of the active layers away from the first portions.

Optionally, one or more power supply lines configured to provide one or more power supply signals to the first portions are on a side of the second portions away from the base substrate.

Optionally, the scan circuit further comprises multiple power supply lines; wherein a first power supply line of the multiple power supply lines is configured to provide a power supply signal to a first portion of a gate electrode of at least one transistor in the respective scan unit; and a second power supply line of the multiple power supply lines is configured to provide a power supply signal to first portion of gate electrodes of a group of transistors in the respective scan unit.

Optionally, first portions of gate electrodes of the group of transistors in the respective scan unit are parts of a unitary structure.

Optionally, the scan circuit further comprises a third power supply line, a fourth power supply line, and a fifth power supply line; wherein the fourth power supply line is connected to, and configured to provide a power supply signal to, a first portion of a gate electrode of a first transistor in the respective scan unit; the fifth power supply line is connected to, and configured to provide a power supply signal to, a first portion of a gate electrode of a third transistor in the respective scan unit; and the third power supply line is connected to, and configured to provide a power supply signal to, a unitary structure comprising first portions of gate electrode of transistors other than the first transistor and the third transistor in the respective scan unit.

In another aspect, the present disclosure provides an array substrate, comprising a plurality of scan circuits; wherein the plurality of scan circuits comprises the scan circuit described herein.

Optionally, the unitary structure comprises first portions of gate electrodes of at least two transistors in each of a plurality of scan units in a same stage respectively from the plurality of scan circuits.

Optionally, the first portions of the gate electrodes of the at least two transistors in each of a plurality of scan units in a same stage respectively from the plurality of scan circuits are connected to a same power supply signal line.

Optionally, the unitary structure comprises first portions of respective gate electrodes of all transistors of a plurality of scan units in a same stage respectively from the plurality of scan circuits.

Optionally, first portions of respective gate electrodes of all transistors of a plurality of scan units in a same stage respectively from the plurality of scan circuits are connected to a same power supply signal line.

Optionally, the array substrate further comprises a third power supply line, a plurality of fourth power supply lines, and a plurality of fifth power supply lines: wherein a respective fourth power supply line of plurality of fourth power supply lines is connected to, and configured to provide a power supply signal to, first portions of gate electrodes of first transistors in a respective scan circuit of the plurality of scan circuits; a respective fifth power supply line of plurality of fifth power supply lines is connected to, and configured to provide a power supply signal to, first portions of gate electrodes of third transistors in the respective scan circuit of the plurality of scan circuits: and the third power supply line is connected to, and configured to provide a power supply signal to, a unitary structure comprising first portions of gate electrode of transistors other than the first transistor and the third transistor in each of a plurality of scan units in a same stage respectively from the plurality of scan circuits.

Optionally, the array substrate further comprises a plurality of unitary structures commonly connected to a single third power supply line in a peripheral area of the array substrate; wherein a respective unitary structure of the plurality of unitary structures comprises first portions of respective gate electrodes of transistors of a plurality of scan units in a same respective stage respectively from the plurality of scan circuits.

Optionally, the array substrate further comprises a plurality of unitary structures commonly connected to a single third power supply line in a peripheral area of the array substrate; wherein a respective unitary structure of the plurality of unitary structures comprises first portions of gate electrodes of second transistors, fourth transistors, fifth transistors, sixth transistors, seventh transistors, eighth transistors, ninth transistors, and tenth transistors of a plurality of scan units in a same stage respectively from the plurality of scan circuits.

In another aspect, the present disclosure provides a display apparatus, comprising the scan circuit described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Related scan circuits in related display apparatuses typically use polysilicon as the semiconductor material for making the active layers of the transistors. However, polysilicon transistor is prone to leakage current. The inventors of the present disclosure discover that transistors having metal oxide materials as the material for making the active layers have better performance with negligible leakage current. Further, the inventors of the present disclosure discover that, surprisingly and unexpected, substrate bias effect can be used to significantly improve the performance of the metal oxide transistors.

Substrate bias effect refers to the influence of the substrate voltage between the source and drain on the transistor's threshold voltage (Vth). When the substrate voltage is positive, it will cause the Vth to shift towards positive bias; conversely, when the substrate voltage is negative, it will cause the Vth to shift towards negative bias. The inventors of the present disclosure discover that substrate bias effect can be used to achieve a positive bias of Vth in the transistor, ensuring that the transistor can be turned on or off correctly. Specifically, the substrate voltage of the transistor can be set to a positive value, which will cause the Vth to shift towards positive bias. This method ensures that the transistor operates within the correct voltage range and avoids unnecessary errors.

Accordingly, the present disclosure provides, inter alia, a scan circuit, an array substrate, and a display apparatus that substantially obviate one or more of the problems due to limitations and disadvantages of the related art. In one aspect, the present disclosure provides a scan circuit. In some embodiments, the scan circuit includes a plurality of scan units. Optionally, a respective scan unit of the plurality of scan units comprises a plurality of transistors. Optionally, a respective gate electrode of a respective transistor of the plurality of transistors comprises a first portion and a second portion in different layers. Optionally, first portions of respective gate electrodes of the plurality of transistors in the respective scan unit are configured to be provided with a power supply signal. Optionally, second portions of the respective gate electrodes of the plurality of transistors in the respective scan unit are configured to be provided with gate scanning signals, respectively. Optionally, first portions of gate electrodes of at least two transistors in the respective scan unit are parts of a unitary structure.

Figure 1:
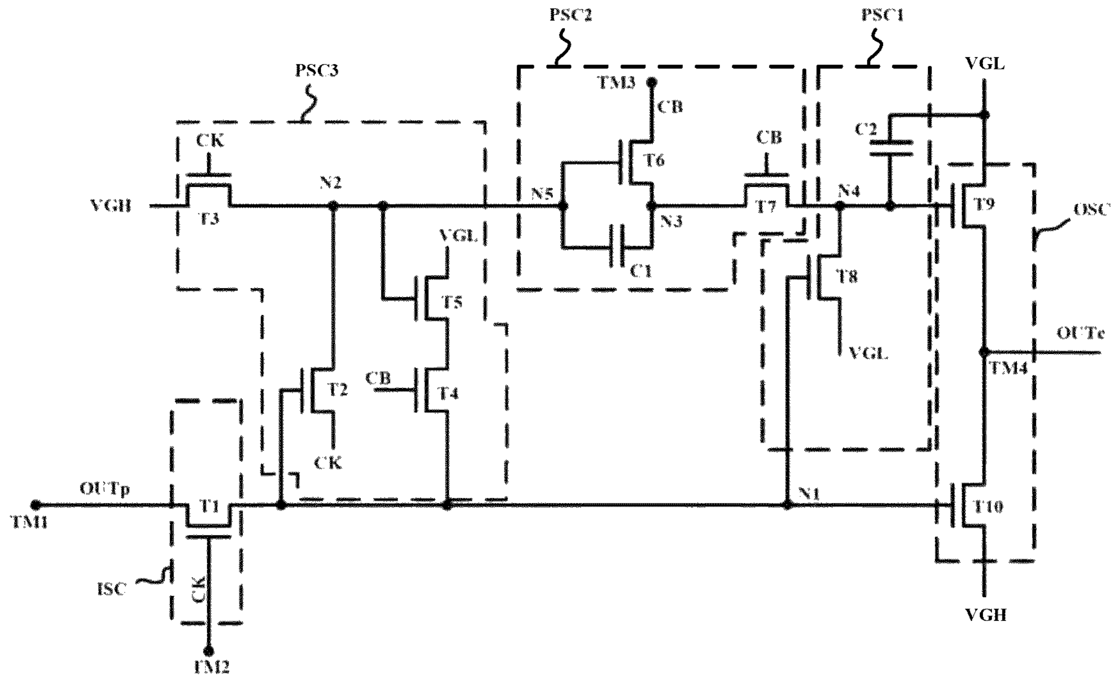
FIG. 1 is a circuit diagram of a respective scan unit of a scan circuit in some embodiments according to the present disclosure.

Various appropriate scan circuits may be used in the present disclosure. FIG. 1 is a circuit diagram of a respective scan unit of a scan circuit in some embodiments according to the present disclosure. Referring to FIG. 1, the respective scan unit in some embodiments includes an input subcircuit ISC, an output subcircuit OSC, a first processing subcircuit PSC1, a second processing subcircuit PSC2, and a third processing subcircuit PSC3. A respective scan unit may be configured to transmit control signals to one or more rows of subpixels. In one example, the respective scan unit is configured to transmit control signals to a single row of subpixels. In another example, the respective scan unit is configured to transmit control signals to two or more rows of subpixels.

In some embodiments, the output subcircuit OSC is configured to supply the voltage of a first power supply signal VGL or a second power supply signal VGH to an output terminal TM4 in response to voltages of a fourth node N4 and a first node N1. Optionally, the output subcircuit OSC includes a ninth transistor T9 and a tenth transistor T10.

The ninth transistor T9 is coupled between a first power supply signal VGL and the output terminal TM4. A gate electrode of the ninth transistor T9 is coupled to the fourth node N4. The ninth transistor T9 may be turned on or off depending on the voltage of the fourth node N4. Optionally, when the ninth transistor T9 is turned on, the voltage of the first power supply signal VGL is provided to the output terminal TM4, which (annotated as Outc in FIG. 1) may be transmitted to an n-th gate line and used as a gate driving signal having a gate-on level.

The tenth transistor T10 is coupled between the output terminal TM4 and a second power supply signal VGH. A gate electrode of the tenth transistor T10 is coupled to the first node N1. The tenth transistor T10 may be turned on or off depending on the voltage of the first node N1. Optionally, when the tenth transistor T10 is turned on, the voltage of the second power supply signal VGH is provided to the output terminal TM4, which (annotated as Outc in FIG. 1) may be provided to an n-th gate line and used as a gate driving signal having a gate-off level. In one example, when the gate driving signal has a gate-off level, it may be understood that the gate driving signal is not provided.

In some embodiments, the input subcircuit ISC is configured to control the voltages of the first node N1 in response to signals provided to the first input terminal TM1 and the second input terminal TM2, respectively. Optionally, the input subcircuit ISC includes a first transistor T1.

The first transistor T1 is coupled between the first input terminal TM1 and the first node N1. A gate electrode of the first transistor T1 is coupled to the second input terminal TM2. When the first clock signal CK is provided to the second input terminal TM2, the first transistor T1 is turned on to electrically couple the first input terminal TM1 with the first node N1.

In some embodiments, the first processing subcircuit PSC1 is configured to control the voltage of the fourth node N4 in response to the voltages of the first node N1. Optionally, the first processing subcircuit PSC1 includes an eighth transistor TR and a second capacitor C2.

The eighth transistor T8 is coupled between the first power supply signal VGL and the fourth node N4. A gate electrode of the eighth transistor T8 is coupled to the first node N1. The eighth transistor T8 may be turned on or off depending on the voltage of the first node N1. Optionally, when the eighth transistor T8 is turned on, the voltage of the first power supply signal VGL may be provided to the fourth node N4.

The second capacitor C2 is coupled between the first power supply signal VGL and the fourth node N4. Optionally, the second capacitor C2 is configured to charge a voltage to be applied to the fourth node N4. Optionally, the second capacitor C2 is configured to stably maintain the voltage of the fourth node N4.

In some embodiments, the second processing subcircuit PSC2 is coupled to a fifth node N5, and is configured to control the voltage of the fourth node N4 in response to a signal input to the third input terminal TM3. Optionally, the second processing subcircuit PSC2 includes a sixth transistor T6, a seventh transistor T7, and a first capacitor C1.

A first terminal of the first capacitor C1 is coupled to the fifth node N5, and a second terminal of the first capacitor C1 is coupled to a third node N3 that is a common node between the sixth transistor T6 and the seventh transistor T7.

The sixth transistor T6 is coupled between the third node N3 and the fifth node N5. A gate electrode of the sixth transistor T6 is coupled to the fifth node N5. The sixth transistor T6 may be turned on depending on the voltage of the fifth node N5 so that a voltage corresponding to the second clock signal CB provided to the third input terminal TM3 may be applied to the third node NB.

The seventh transistor T7 is coupled between the fourth node N4 and the third node N3. A gate electrode of the seventh transistor T7 is coupled to the third input terminal TM3. The seventh transistor T7 may be turned on in response to the second clock signal CB provided to the third input terminal TM3, and thus, applies the voltage of the first power supply signal VGL to the third node N3.

In some embodiments, the third processing subcircuit PSC3 is configured to control the voltage of the second node N2. Optionally, the third processing subcircuit PSC3 includes a second transistor T2, a third transistor T3, a fourth transistor T4, and a fifth transistor T5.

The fifth transistor T5 is coupled between the first power supply signal VGL and the fourth transistor T4. A gate electrode of the fifth transistor T5 is coupled to the second node N2. The fifth transistor T5 may be turned on or off depending on the voltage of the second node N2.

The fourth transistor T4 is coupled between the fifth transistor T5 and the first node. A gate electrode of the fourth transistor T4 is configured to be provided with the second clock signal CB provided to the third input terminal TM3. A first electrode of the fourth transistor T4 is coupled to the first node N1. A second electrode of the fourth transistor T4 is coupled to the second electrode of the fifth transistor T5.

The second transistor T2 is coupled between the second node N2 and the second input terminal TM2. A gate electrode of the second transistor T2 is coupled to the first node N1.

The third transistor T3 is coupled between the second node N2 and the second power supply signal VGH. A gate electrode of the third transistor T3 is coupled to the second input terminal TM2. When the first clock signal CK is provided to the second input terminal TM2, the third transistor T3 may be turned on so that the voltage of the second power supply signal VGH may be provided to the second node N2.

The present disclosure may be implemented in scan circuits having transistors of various types, including a scan circuit having p-type transistors, a scan circuit having n-type transistors, and a scan circuit having one or more p-type transistors and one or more n-type transistors. For a p-type transistor, an effective control signal (e.g., a turn-on control signal) is a low voltage signal, and an ineffective control signal (e.g., a turn-off control signal) is a high voltage signal. For an n-type transistor, an effective control signal (e.g., a turn-on control signal) is a high voltage signal, and an ineffective control signal (e.g., a turn-off control signal) is a low voltage signal.

In some embodiments, referring to FIG. 1, each of the first to tenth transistors T1 to T10 may be formed of an n-type transistor such as a metal oxide transistor. In some embodiments, the gate-on voltage of the first to tenth transistors T1 to T10 may be set to a high level, and the gate-off voltage thereof may be set to a low level.

In alternative embodiments, each of the first to tenth transistors T1 to T10 may be formed of a p-type transistor. In some embodiments, the gate-on voltage of the first to tenth transistors T1 to T10 may be set to a low level, and the gate-off voltage thereof may be set to a high level.

Figure 2:
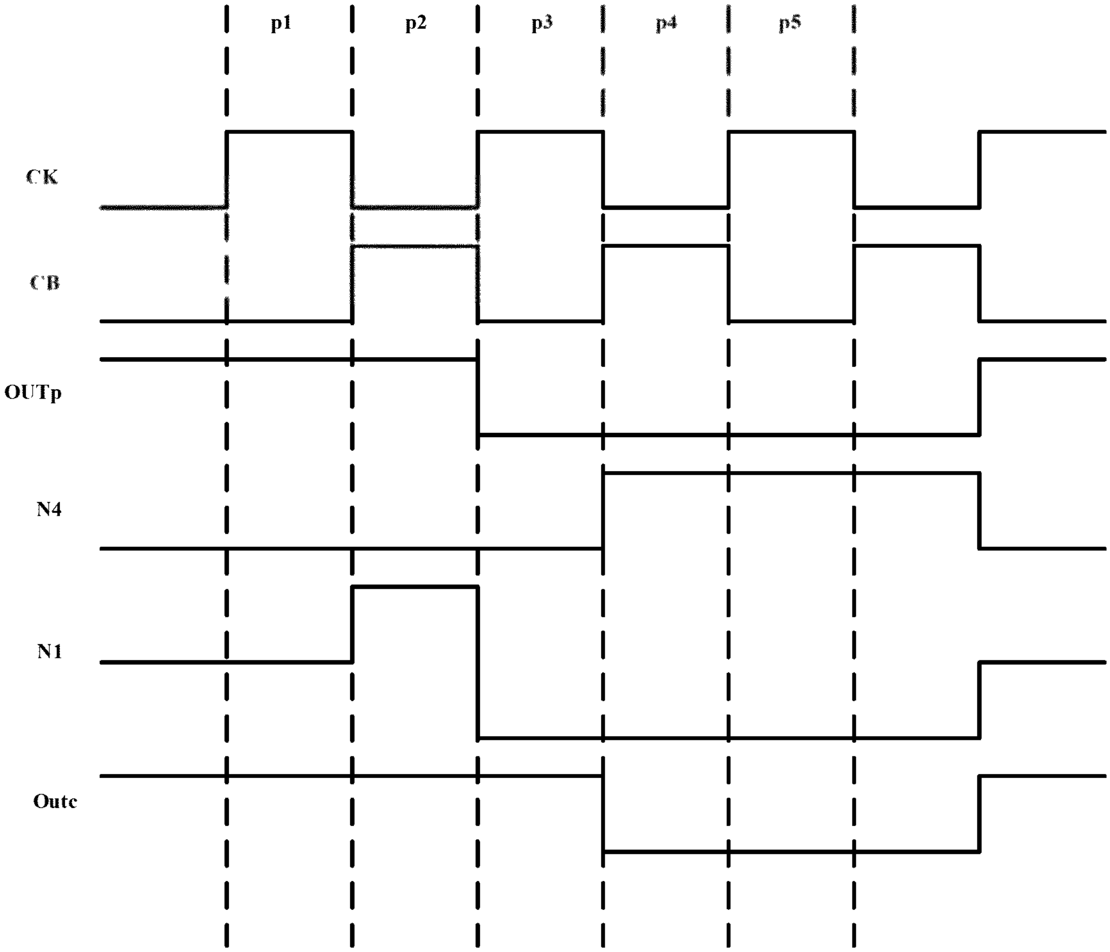
FIG. 2 is a timing diagram illustrating an operation of the respective scan unit illustrated in FIG. 1.

FIG. 2 is a timing diagram illustrating an operation of the respective scan unit illustrated in FIG. 1. Referring to FIG. 2, the operation of the respective scan unit in some embodiments includes a first period p1, a second period p2, a third period p3, a fourth period p4, and a fifth period p5.

In some embodiments, during a first period p1, the first clock signal CK is provided to the second input terminal TM2. The first transistor T1 and the third transistor T3 are turned on. Furthermore, during the first period p1, the second clock signal CB is not provided to the third input terminal TM3, the fourth transistor T4 and the seventh transistor T7 is turned off.

In some embodiments, during the first period p1, the start signal STV or the output signal Outp from the output terminal of the previous scan unit to be provided to the first input terminal TM1 has the high level, a high voltage (e.g., the voltage of the second power supply signal VGH) may be applied to the first node N1. When the first node N1 is set to the high voltage, the second transistor T2, the eighth transistor T8, and the tenth transistor T10 are turned on.

In some embodiments, when the second transistor T2 is turned on, the voltage of the first clock signal CK is provided to the second node N2. The fifth transistor T5 and the sixth transistor T6 are turned on.

In some embodiments, when the third transistor T3 is turned on, the voltage of the second power supply signal VGH is provided to the second node N2. The fifth transistor T5 and the sixth transistor T6 are turned on.

In some embodiments, when the eighth transistor T8 is turned on, the voltage of the first power supply signal VGL is provided to the fourth node N4. The ninth transistor T9 is turned off.

In some embodiments, when the tenth transistor T10 is turned on, the voltage of the second power supply signal VGH is provided to the output terminal TM4. During the first period p1, the gate driving signal are not provided to the n-th stage gate line.

In some embodiments, during a second period p2, the supply of the first clock signal CK to the second input terminal TM2 is interrupted. The first transistor T1 and the third transistor T3 are turned off. The first node N1 maintains the voltages of the preceding period. Since the first node N1 remains in the high voltage state, the second transistor T2, the eighth transistor T8, and the tenth transistor T10 remain turned on. When the eighth transistor T8 remains turned on, the voltage of the first power supply signal VGL is provided to the fourth node N4. Since the fourth node N4 remains in the low voltage state, the ninth transistor T9 remains turned off.

In some embodiments, during the second period p2, the second clock signal CB is provided to the third input terminal TM3. The fourth transistor T4 and the seventh transistor T7 are turned on by the second clock signal CB provided to the third input terminal TM3. When the seventh transistor T7 is turned on, the fourth node N4 and the third node N3 are electrically coupled to each other. The third node N3 is set to the low voltage.

In some embodiments, during a third period p3, the supply of the second clock signal CB to the third input terminal TM3 is interrupted. When the supply of the second clock signal CB is interrupted, the seventh transistor T7 is turned off.

In some embodiments, during the third period p3, the start signal STV or the output signal Outp from the output terminal of the previous scan unit is provided to the first input terminal TM1, and the first clock signal CK is provided to the second input terminal TM2. When the first clock signal CK is provided to the second input terminal TM2, the first transistor T1 and the third transistor T3 are turned on.

In some embodiments, when the first transistor T1 is turned on, the first input terminal TM1 is electrically coupled with the first node N1. The first node N1 is set to the low voltage by the start signal STV or the output signal Outp from the output terminal of the previous scan unit that is provided to the first input terminal TM1. When the first node N1 is set to the low voltage, the second transistor T2, the eighth transistor T8, and the tenth transistor T10 are turned off.

In some embodiments, when the sixth transistor T6 is turned on, the third input terminal TM3 and the third node N3 are electrically coupled to each other. Since the second clock signal CB is not provided to the third input terminal TM3 during the third period p3, the third node N3 is maintained at the low voltage. Since the seventh transistor T7 remains turned off, the voltage of the third node N3 does not affect the voltage of the fourth node N4. The first capacitor C1 is configured to store a voltage corresponding to the turn-on level of the sixth transistor T6.

In some embodiments, during a fourth period p4, the second clock signal CB may be provided to the third input terminal TM3. When the second clock signal CB is provided to the third input terminal TM3, the seventh transistor T7 is turned on.

In some embodiments, when the seventh transistor T7 is turned on, the fourth node N4 and the third node N3 are electrically coupled to each other. The high voltage of the second clock signal CB that is provided to the third input terminal TM3 via the sixth transistor T6 that remains turned on is provided to the third node N3 and the fourth node N4. When the high voltage is provided to the fourth node N4, the ninth transistor T9 is turned on.

In some embodiments, when the ninth transistor T9 is turned on, the voltage of the first power supply signal VGL is provided to the output terminal TM4. The voltage of the first power supply signal VGL that is provided to the output terminal TM4 is provided to the n-th stage gate line as the gate driving signal.

In some embodiments, during a fifth period p5, the supply of the second clock signal CB to the third input terminal TM3 is interrupted. When the supply of the second clock signal CB is interrupted, the seventh transistor T7 is turned off. The fourth node N4 is stably maintained at the high voltage by the second capacitor C2. The ninth transistor T9 remains turned on, and the voltage of the first power supply signal VGL is provided to the n-th stage gate line as the gate driving signal.

The supply of the second clock signal CB is interrupted during the fifth period p5, so that the fourth transistor T4 remains turned off and, therefore, the voltage of the second clock signal CB does not affect the voltage of the first node N1.

Figure 3:
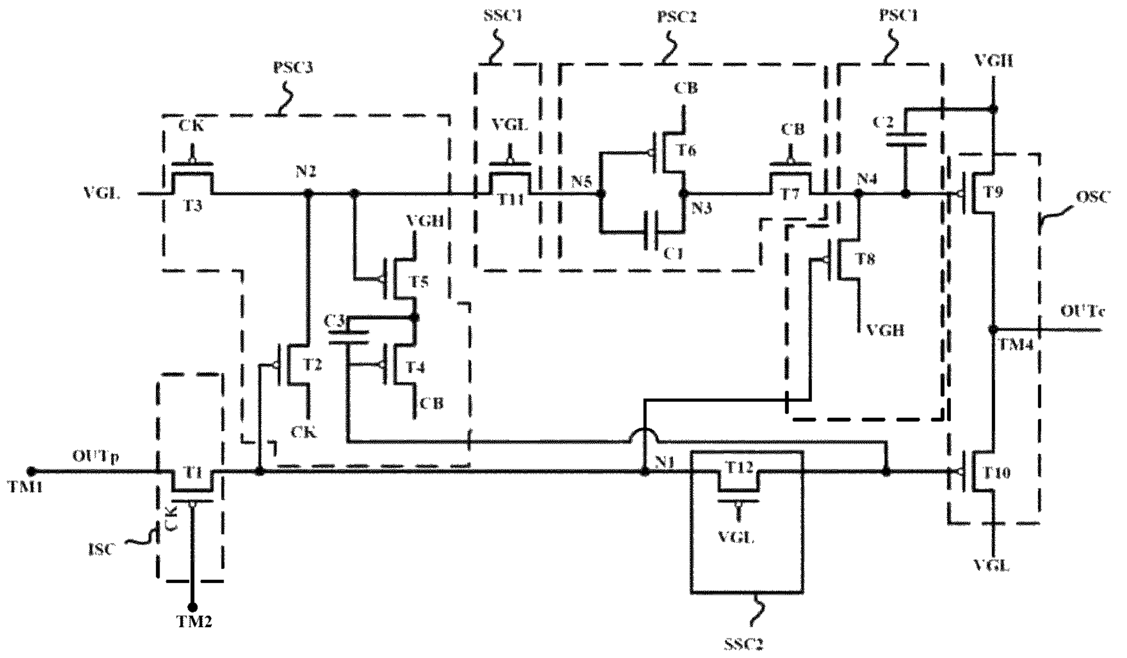
FIG. 3 is a circuit diagram of a respective scan unit of a scan circuit in some embodiments according to the present disclosure.

Various alternative scan circuits may be used in the present disclosure. FIG. 3 is a circuit diagram of a respective scan unit of a scan circuit in some embodiments according to the present disclosure. Referring to FIG. 3, the respective scan unit in some embodiments includes an input subcircuit ISC, an output subcircuit OSC, a first processing subcircuit PSC1, a second processing subcircuit PSC2, a third processing subcircuit PSC3, a first stabilizing subcircuit SSC1, and a second stabilizing subcircuit SSC2. A respective scan unit may be configured to transmit control signals to one or more rows of subpixels. In one example, the respective scan unit is configured to transmit control signals to a single row of subpixels. In another example, the respective scan unit is configured to transmit control signals to two or more rows of subpixels.

In some embodiments, the output subcircuit OSC is configured to supply the voltage of a second power supply signal VGH or a first power supply signal VGL to an output terminal TM4 in response to voltages of a fourth node N4. Optionally, the output subcircuit OSC includes a ninth transistor T9 and a tenth transistor T10.

The ninth transistor T9 is coupled between a second power supply signal VGH and the output terminal TM4. A gate electrode of the ninth transistor T9 is coupled to the fourth node N4. The ninth transistor T9 may be turned on or off depending on the voltage of the fourth node N4. Optionally, when the ninth transistor T9 is turned on, the voltage of the second power supply signal VGH is provided to the output terminal TM4, which (annotated as Outc in FIG. 3) may be transmitted to an n-th gate line and used as a gate driving signal having a gate-on level.

The tenth transistor T10 is coupled between the output terminal TM4 and a first power supply signal VGL. A gate electrode of the tenth transistor T10 is coupled to the first node N1. The tenth transistor T10 may be turned on or off depending on the voltage of the first node N1. Optionally, when the tenth transistor T10 is turned on, the voltage of the first power supply signal VGL is provided to the output terminal TM4, which (annotated as Outc in FIG. 3) may be provided to an n-th gate line and used as a gate driving signal having a gate-off level. In one example, when the gate driving signal has a gate-off level, it may be understood that the gate driving signal is not provided.

In some embodiments, the input subcircuit ISC is configured to control the voltages of the first node N1 in response to signals provided to the first input terminal TM1 and the second input terminal TM2, respectively. Optionally, the input subcircuit ISC includes a first transistor T1.

The first transistor T1 is coupled between the first input terminal TM1 and the first node N1. A gate electrode of the first transistor T1 is coupled to the second input terminal TM2. When the first clock signal CK is provided to the second input terminal TM2, the first transistor T1 is turned on to electrically couple the first input terminal TM1 with the first node N1.

In some embodiments, the first processing subcircuit PSC1 is configured to control the voltage of the fourth node N4 in response to the voltages of the first node N1. Optionally, the first processing subcircuit PSC1 includes an eighth transistor T8 and a second capacitor C2.

The eighth transistor T8 is coupled between the second power supply signal VGH and the fourth node N4. A gate electrode of the eighth transistor T8 is coupled to the first node N1. The eighth transistor T8 may be turned on or off depending on the voltage of the first node N1. Optionally, when the eighth transistor T8 is turned on, the voltage of the second power supply signal VGH may be provided to the fourth node N4.

The second capacitor C2 is coupled between the second power supply signal VGH and the fourth node N4. Optionally, the second capacitor C2 is configured to charge a voltage to be applied to the fourth node N4. Optionally, the second capacitor C2 is configured to stably maintain the voltage of the fourth node N4.

In some embodiments, the second processing subcircuit PSC2 is coupled to a fifth node N5, and is configured to control the voltage of the fourth node N4 in response to a signal input to the third input terminal TM3. Optionally, the second processing subcircuit PSC2 includes a sixth transistor T6, a seventh transistor T7, and a first capacitor C1.

A first terminal of the first capacitor C1 is coupled to the fifth node N5, and a second terminal of the first capacitor C1 is coupled to a third node N3 that is a common node between the sixth transistor T6 and the seventh transistor T7.

The sixth transistor T6 is coupled between the third node N3 and the fifth node N5. A gate electrode of the sixth transistor T6 is coupled to the fifth node N5. The sixth transistor T6 may be turned on depending on the voltage of the fifth node N5 so that a voltage corresponding to the second clock signal CB provided to the third input terminal TM3 may be applied to the third node N3.

The seventh transistor T7 is coupled between the fourth node N4 and the third node N3. A gate electrode of the seventh transistor T7 is coupled to the third input terminal TM3. The seventh transistor T7 may be turned on in response to the second clock signal CB provided to the third input terminal TM3, and thus, applies the voltage of the second power supply signal VGH to the third node N3.

In some embodiments, the third processing subcircuit PSC3 is configured to control the voltage of the second node N2. Optionally, the third processing subcircuit PSC3 includes a second transistor T2, a third transistor T3, a fourth transistor T4, a fifth transistor T5, and a third capacitor C3.

The fifth transistor T5 is coupled between the second power supply signal VGH and the fourth transistor T4. A gate electrode of the fifth transistor T5 is coupled to the second node N2. The fifth transistor T5 may be turned on or off depending on the voltage of the second node N2.

The fourth transistor T4 is coupled between the fifth transistor T5 and the third input terminal TM3. A first electrode of the fourth transistor T4 is configured to be provided with the second clock signal CB provided to the third input terminal TM3. A gate electrode of the fourth transistor T4 is coupled to the gate electrode of the tenth transistor T10. A second electrode of the fourth transistor T4 is coupled to the second electrode of the fifth transistor T5.

The second transistor T2 is coupled between the second node N2 and the second input terminal TM2. A gate electrode of the second transistor T2 is coupled to the first node N1.

The third transistor T3 is coupled between the second node N2 and the first power supply signal VGL. A gate electrode of the third transistor T3 is coupled to the second input terminal TM2. When the first clock signal CK is provided to the second input terminal TM2, the third transistor T3 may be turned on so that the voltage of the first power supply signal VGL may be provided to the second node N2.

The third capacitor C3 is coupled between the tenth transistor T10 and the fifth transistor T5. A first capacitor electrode of the third capacitor C3 is coupled to the second electrode of the fifth transistor T5 and the first electrode of the fourth transistor T4. A second capacitor electrode of the third capacitor C3 is coupled to the gate electrode of the fourth transistor T4 and the gate electrode of the tenth transistor T10.

In some embodiments, the first stabilizing subcircuit SSC1 is coupled between the second processing subcircuit PSC2 and the third processing subcircuit PSC3. Optionally, the first stabilizing subcircuit SSC1 is configured to limit a voltage drop width of the second node N2. Optionally, the first stabilizing subcircuit SSC1 includes an eleventh transistor T11.

The eleventh transistor T11 is coupled between the second node N2 and the fifth node N5. A gate electrode of the eleventh transistor T11 is coupled to the first power supply signal VGL. Since the first power supply signal VGL has a gate-on level voltage, the eleventh transistor T11 may always remain turned on. Therefore, the second node N2 and the fifth node N5 may be maintained at the same voltage, and operated as substantially the same node.

In some embodiments, the second stabilizing subcircuit SSC2 is coupled between the first node N1 and the output subcircuit OSC. Optionally, the second stabilizing subcircuit SSC2 is configured to limit a voltage drop width of the first node N1. Optionally, the second stabilizing subcircuit SSC2 includes a twelfth transistor T12.

The twelfth transistor T12 is coupled between the first node N1 and a gate electrode of the tenth transistor T10. A gate electrode of the twelfth transistor T12 is coupled to the first power supply signal VGL. Since the first power supply signal VGL has a gate-on level voltage, the twelfth transistor T12 may always remain turned on. Therefore, the first node N1 and the gate electrode of the tenth transistor T10 may be maintained at the same voltage.

In some embodiments, referring to FIG. 3, each of the first to twelfth transistors T1 to T12 may be formed of an n-type transistor. In some embodiments, the gate-on voltage of the first to twelfth transistors T1 to T12 may be set to a high level, and the gate-off voltage thereof may be set to a low level.

In alternative embodiments, each of the first to twelfth transistors T1 to T12 may be formed of a p-type transistor. In some embodiments, the gate-on voltage of the first to twelfth transistors T1 to T12 may be set to a low level, and the gate-off voltage thereof may be set to a high level.

Figure 4:
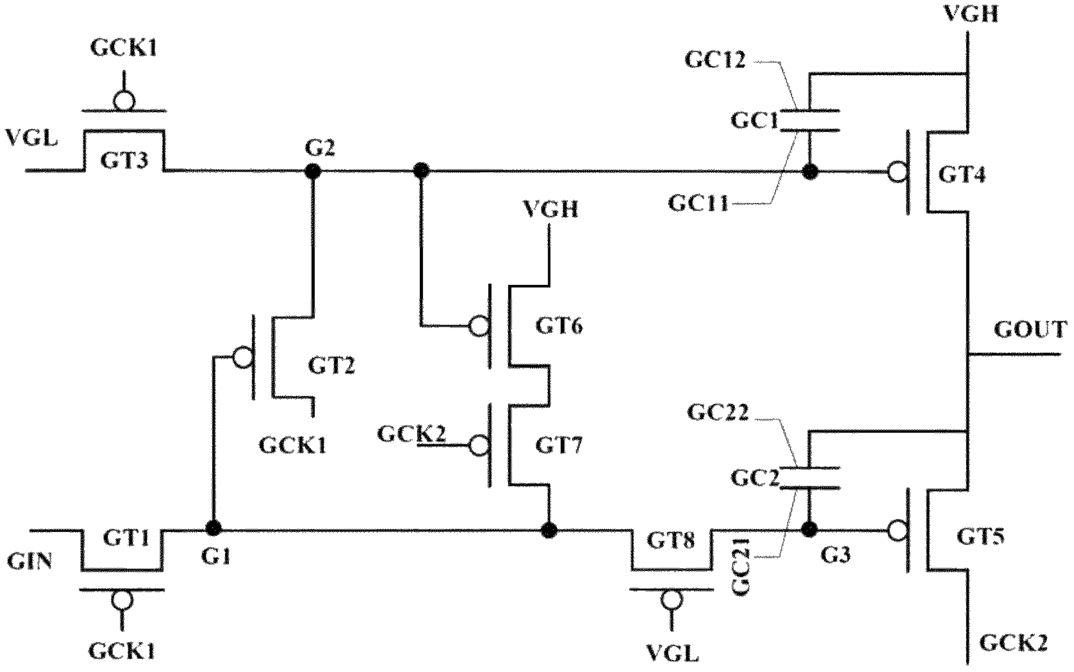
FIG. 4 is a circuit diagram of a respective scan unit of a scan circuit in some embodiments according to the present disclosure.

Various alternative scan circuits may be used in the present disclosure. FIG. 4 is a circuit diagram of a respective scan unit of a scan circuit in some embodiments according to the present disclosure. Referring to FIG. 4, the respective scan unit in some embodiments includes a first control transistor GT1 to an eighth control transistor GT8, a first control capacitor GC1 and a second control capacitor GC2. In some embodiments, a gate electrode of the first control transistor GT1 is electrically connected to a first clock signal terminal GCK1, a first electrode of the first control transistor GT1 is electrically connected to an input terminal GIN, a second electrode of the first control transistor GT1 is electrically connected to a first node G1; a gate electrode of the second control transistor GT2 is electrically connected to the first node G1, a first electrode of the second control transistor GT2 is electrically connected to the first clock signal terminal GCK1, the second electrode of the second control transistor GT2 is electrically connected to a second node G2; a gate electrode of the third control transistor GT3 is electrically connected to a first clock signal terminal GCK1, a first electrode of the third control transistor GT3 is electrically connected to a first power supply signal VGL, a second electrode of the third control transistor GT3 is electrically connected to the second node G2; a gate electrode of the fourth control transistor GT4 is electrically connected to the second node G2, a first electrode of the fourth control transistor GT4 is electrically connected to a second power supply signal VGH, a second electrode of the fourth control transistor GT4 is electrically connected to an output terminal GOUT; a gate electrode of the fifth control transistor GT5 is electrically connected to a third node G3, a first electrode of the fifth control transistor GT5 is electrically connected to a second clock signal terminal GCK2, a second electrode of the fifth control transistor GT5 is electrically connected to the output terminal GOUT; a gate electrode of the sixth control transistor GT6 is electrically connected to the second node G2, a first electrode of the sixth control transistor GT6 is electrically connected to the second power supply signal VGH, a second electrode of the sixth control transistor GT6 is electrically connected to a first electrode of a seventh control transistor GT7; a gate electrode of the seventh control transistor GT7 is electrically connected to the second clock signal terminal GCK2, a second electrode of the seventh control transistor GT7 is electrically connected to the first node G1; a gate electrode of the eighth control transistor GT8 is electrically connected to a first power supply signal VGL, a first electrode of the eighth control transistor GT8 is electrically connected to the first node G1, a second electrode of the eighth control transistor GT8 is electrically connected to a third node G3; a first electrode plate GC11 of a first control capacitor GC1 is electrically connected to the second node G2, a second electrode plate GC12 of the first control capacitor GC1 is electrically connected to the second power supply signal VGH; and a first electrode plate GC21 of a second control capacitor GC2 is electrically connected to the third node G3, and a second electrode plate GC22 of the second control capacitor GC2 is electrically connected to the output terminal GOUT. In one example, the first control transistor GT1 to the eighth control transistor GT8 may be a P-type transistor or may be an N-type transistor. In another example, the second power supply signal VGH provides a continuous high level signal and the first power supply signal VGL provides a continuous low level signal.

Figure 5A:
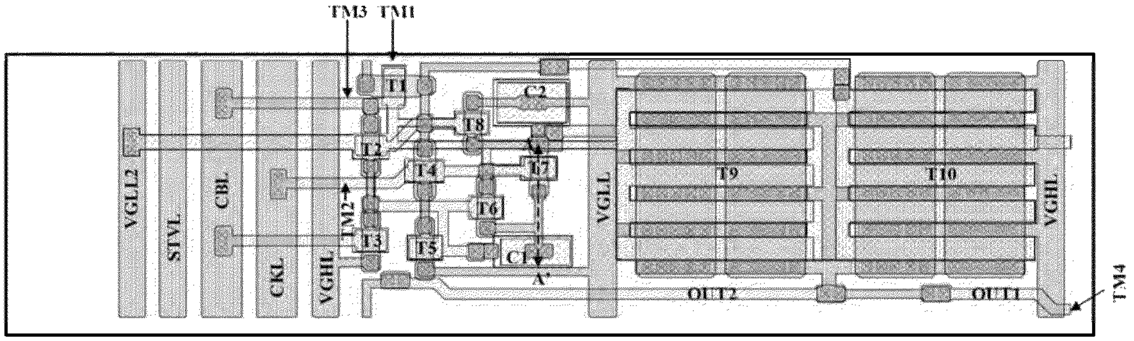
FIG. 5A is a diagram illustrating the structure of a respective scan unit of a scan circuit in some embodiments according to the present disclosure.
Figure 5B:
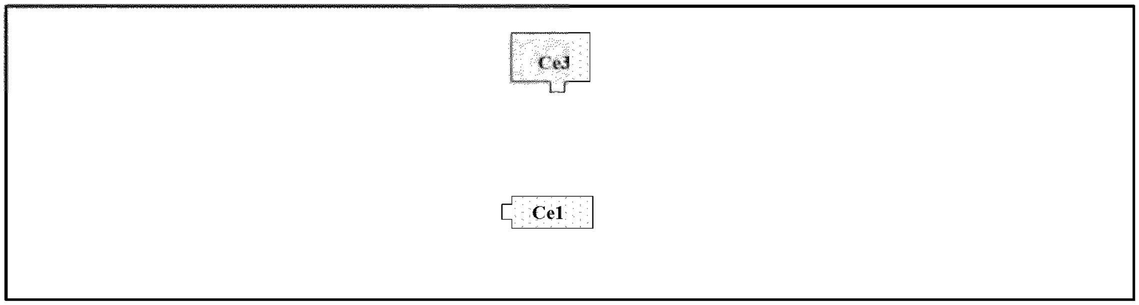
FIG. 5B is a diagram illustrating the structure of a light shield layer in the respective scan unit depicted in FIG. 5A.
Figure 5C:
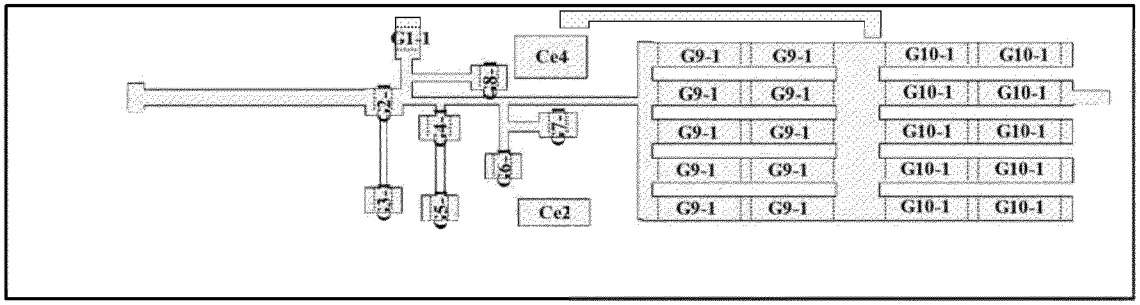
FIG. 5C is a diagram illustrating the structure of a first conductive layer in the respective scan unit depicted in FIG. 5A.
Figure 5D:
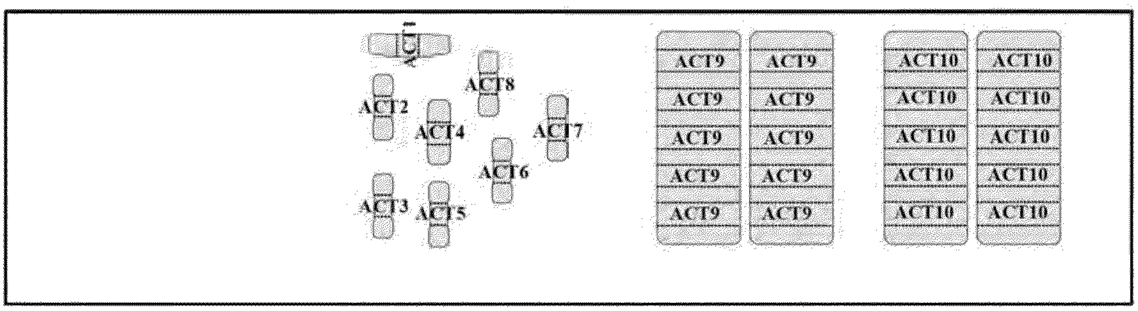
FIG. 5D is a diagram illustrating the structure of a semiconductor material layer in the respective scan unit depicted in FIG. 5A.
Figure 5E:
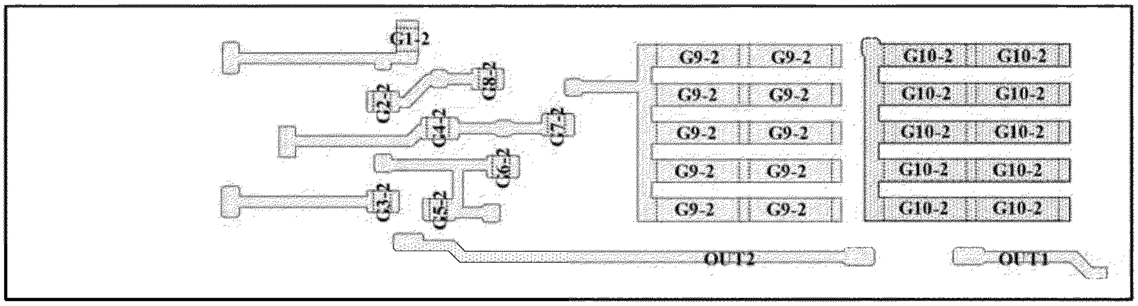
FIG. 5E is a diagram illustrating the structure of a second conductive layer in the respective scan unit depicted in FIG. 5A.
Figure 6:
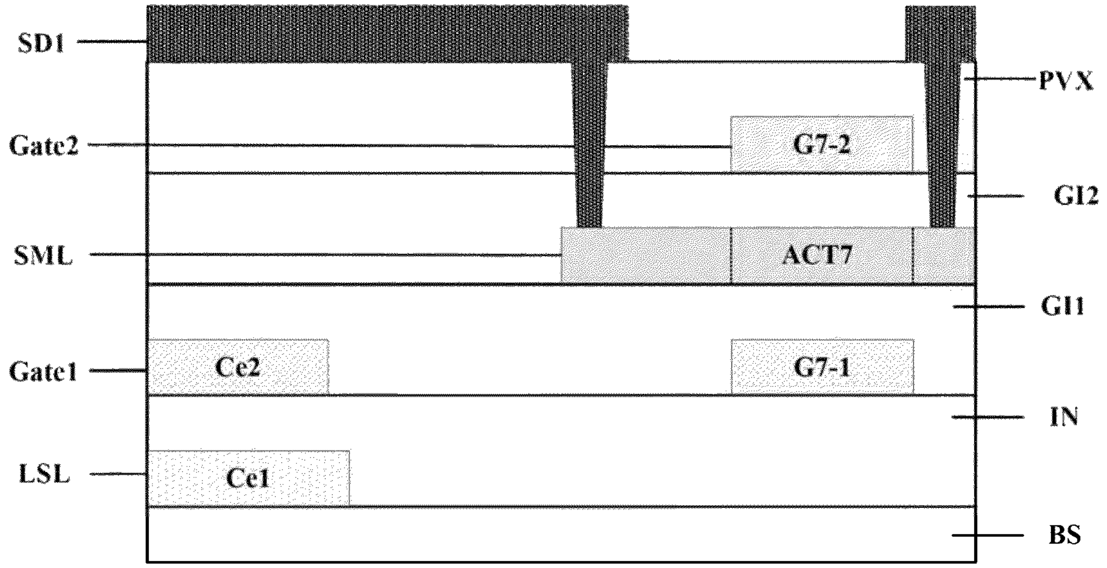
FIG. 6 is a cross-sectional view along an A-A' line in FIG. 5A.

FIG. 5A is a diagram illustrating the structure of a respective scan unit of a scan circuit in some embodiments according to the present disclosure. FIG. 5B is a diagram illustrating the structure of a light shield layer in the respective scan unit depicted in FIG. 5A. FIG. 5C is a diagram illustrating the structure of a first conductive layer in the respective scan unit depicted in FIG. 5A. FIG. 5D is a diagram illustrating the structure of a semiconductor material layer in the respective scan unit depicted in FIG. 5A. FIG. 5E is a diagram illustrating the structure of a second conductive layer in the respective scan unit depicted in FIG. 5A. FIG. 5E is a diagram illustrating the structure of a first signal line layer in the respective scan unit depicted in FIG. 5A. FIG. 6 is a cross-sectional view along an A-A' line in FIG. 5A. FIG. 5A is annotated with labels indicating transistors (T1, T2, T3, T4, T5, T6, T7, T8, T9, and T10) and capacitors (C1 and C2), and signal lines (CB, CK, VGL, VGH, VGL2, and STV) in the respective scan unit.

Referring to FIG. 5A to FIG. 5F, and FIG. 6, in some embodiments, the array substrate includes a base substrate BS, a light shield layer LSL on the base substrate BS, an insulating layer IN on a side of the light shield layer LSL away from the base substrate BS, a first conductive layer Gate1 on a side of the insulating layer IN away from the base substrate BS, a first gate insulating layer GI1 on a side of the first conductive layer Gate1 away from the base substrate BS, a semiconductor material layer SML on a side of the first gate insulating layer GI1 away from the base substrate BS, a second gate insulating layer GI2 on a side of the semiconductor material layer SML away from the base substrate BS, a second conductive layer Gate2 on a side of the second gate insulating layer GI2 away from the base substrate BS, a passivation layer PVX on a side of the semiconductor material layer SML away from the base substrate BS, and a first signal line layer SD1 on a side of the passivation layer PVX away from the base substrate BS.

Referring to FIG. 5A and FIG. 5B, in some embodiments, the light shield layer LSL includes a first capacitor electrode Ce1 of the first capacitor C1 and a third capacitor electrode Ce3 of the second capacitor C2. Various appropriate materials and various appropriate fabricating methods may be used for making the light shield layer. For example, a metallic material may be deposited on the substrate by a plasma-enhanced chemical vapor deposition (PECVD) process. Examples of appropriate metallic materials for making the light shield layer include, but are not limited to, aluminum, chromium, tungsten, titanium, tantalum, molybdenum, copper, and alloys or laminates containing the same.

Referring to FIG. 5A and FIG. 5C, in some embodiments, the first conductive layer Gate1 includes a second capacitor electrode Ce2 of the first capacitor C1, a fourth capacitor electrode Ce4 of the second capacitor C2, and a first portion of a respective gate electrode of a respective transistor. In one example, the first conductive layer Gate1 includes a second capacitor electrode Ce2 of the first capacitor C1, a fourth capacitor electrode Ce4 of the second capacitor C2, a first portion G1-1 of a gate electrode of the first transistor, a first portion G2-1 of a gate electrode of the second transistor, a first portion G3-1 of a gate electrode of the third transistor, a first portion G4-1 of a gate electrode of the fourth transistor, a first portion G5-1 of a gate electrode of the fifth transistor, a first portion G6-1 of a gate electrode of the sixth transistor, a first portion G7-1 of a gate electrode of the seventh transistor, a first portion G8-1 of a gate electrode of the eighth transistor, a first portion G9-1 of a gate electrode of the ninth transistor, and a first portion G10-1 of a gate electrode of the tenth transistor. Various appropriate electrode materials and various appropriate fabricating methods may be used to make the first conductive layer Gate1. For example, a conductive material may be deposited on the substrate by a plasma-enhanced chemical vapor deposition (PECVD) process and patterned. Examples of appropriate conductive materials for making the first conductive layer Gate1 include, but are not limited to, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like.

Referring to FIG. 5A and FIG. 5D, in some embodiments, the semiconductor material layer SML includes active layers of transistors in the respective scan unit. FIG. 5D is annotated with labels indicating the active layers of the transistors in the respective scan unit, for example, an active layer ACT1 of the first transistor, an active layer ACT2 of the second transistor, an active layer ACT3 of the third transistor, an active layer ACT4 of the fourth transistor, an active layer ACT5 of the fifth transistor, an active layer ACT6 of the sixth transistor, an active layer ACT7 of the seventh transistor, an active layer ACT8 of the eighth transistor, an active layer ACT9 of the ninth transistor, and an active layer ACT10 of the tenth transistor. Various appropriate semiconductor materials may be used for making the semiconductor material layer SML. Examples of the semiconductor materials for making the semiconductor material layer SML include metal oxide-based semiconductor material such as indium gallium zinc oxide and metal oxynitride-based semiconductor materials such as zinc oxynitride.

Referring to FIG. 5A and FIG. 5E, in some embodiments, the second conductive layer Gate2 includes a second portion of a respective gate electrode of a respective transistor. In one example, the second conductive layer Gate2 includes a second portion G1-2 of a gate electrode of the first transistor, a second portion G2-2 of a gate electrode of the second transistor, a second portion G3-2 of a gate electrode of the third transistor, a second portion G4-2 of a gate electrode of the fourth transistor, a second portion G5-2 of a gate electrode of the fifth transistor, a second portion G6-2 of a gate electrode of the sixth transistor, a second portion G7-2 of a gate electrode of the seventh transistor, a second portion G8-2 of a gate electrode of the eighth transistor, a second portion G9-2 of a gate electrode of the ninth transistor, and a second portion G10-2 of a gate electrode of the tenth transistor. In some embodiments, the second conductive layer Gate2 further includes a first output signal line OUT1 configured to transmit an output signal from the respective scan unit to the fourth terminal TM4, and a second output signal line OUT2 configured to transmit the output signal from the respective scan unit to a first terminal in a scan unit in a next stage.

Various appropriate electrode materials and various appropriate fabricating methods may be used to make the second conductive layer Gate2. For example, a conductive material may be deposited on the substrate by a plasma-enhanced chemical vapor deposition (PECVD) process and patterned. Examples of appropriate conductive materials for making the second conductive layer Gate2 include, but are not limited to, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like.

Figure 5F:
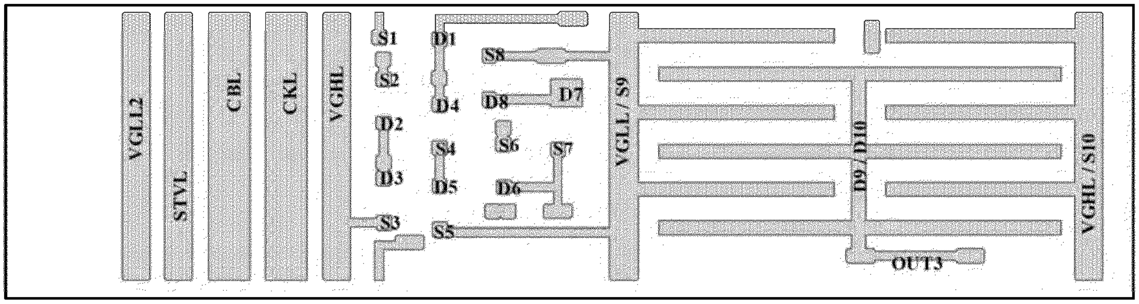
FIG. 5F is a diagram illustrating the structure of a first signal line layer in the respective scan unit depicted in FIG. 5A.

Referring to FIG. 5A and FIG. 5F, the first signal line layer SD1 in some embodiments includes a start signal line STVL, a first clock signal line CKL, a second clock signal line CBL, a first power supply line VGLL, a second power supply line VGHL, a third power supply line VGLL2. FIG. 5F is annotated with labels indicating first electrodes and second electrodes of transistors in the respective scan unit. For example, the first transistor includes a first electrode S1 and a second electrode D1, the second transistor includes a first electrode S2 and a second electrode D2, the third transistor includes a first electrode S3 and a second electrode D3, the fourth transistor includes a first electrode S4 and a second electrode D4, the fifth transistor includes a first electrode S5 and a second electrode D5, the sixth transistor includes a first electrode S6 and a second electrode D6, the seventh transistor includes a first electrode S7 and a second electrode D7, the eighth transistor includes a first electrode S8 and a second electrode D8, the ninth transistor includes a first electrode S9 and a second electrode D9, the tenth transistor includes a first electrode S10 and a second electrode D10. In some embodiments, the first signal line layer SD1 further includes a third output signal line OUT3 connected to second electrodes of the ninth transistor and the tenth transistor. The third output signal line OUT3 is further connected to the first output signal line OUT1 and connected to the second output signal line OUT2.

Various appropriate conductive materials and various appropriate fabricating methods may be used to make the first signal line layer SD1. For example, a conductive material may be deposited on the substrate by a plasma-enhanced chemical vapor deposition (PECVD) process and patterned. Examples of appropriate conductive materials for making the first signal line layer SD1 include, but are not limited to, titanium, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. In some embodiments, the first signal line layer SD1 includes a plurality of sub-layers stacked together. In one example, the first signal line layer SD1 includes a stacked titanium/aluminum/titanium multi-layer structure. In another example, the first signal line layer SD1 includes a stacked molybdenum/aluminum/molybdenum multi-layer structure.

In some embodiments, the first power supply line VGLL is configured to provide a first power supply signal, the second power supply line VGHL is configured to provide a second power supply signal, and the third power supply line VGLL2 is configured to provide a third power supply signal. Optionally, a voltage level of the second power supply signal is higher than a voltage level of the first power supply signal. Optionally, a voltage level of the second power supply signal is higher than a voltage level of the third power supply signal. Optionally, a voltage level of the third power supply signal is higher than a voltage level of the first power supply signal.

Referring to FIG. 5A to FIG. 5F, and FIG. 6, in some embodiments, a respective gate electrode of a respective transistor in the respective scan unit includes two portions in two different layers, respectively. For example, the gate electrode of the first transistor includes a first portion G1-1 and a second portion G1-2; the gate electrode of the second transistor includes a first portion G2-1 and a second portion G2-2; the gate electrode of the third transistor includes a first portion G3-1 and a second portion G3-2: the gate electrode of the fourth transistor includes a first portion G4-1 and a second portion G4-2; the gate electrode of the fifth transistor includes a first portion G5-1 and a second portion G5-2; the gate electrode of the sixth transistor includes a first portion G6-1 and a second portion G6-2; the gate electrode of the seventh transistor includes a first portion G7-1 and a second portion G7-2; the gate electrode of the eighth transistor includes a first portion G8-1 and a second portion G8-2; the gate electrode of the ninth transistor includes a first portion G9-1 and a second portion G9-2; and the gate electrode of the tenth transistor includes a first portion G10-1 and a second portion G10-2.

In one example, a first portion of the respective gate electrode of the respective transistor in the respective scan unit is in the first conductive layer Gate1, and a second portion of the respective gate electrode of the respective transistor in the respective scan unit is in the second conductive layer Gate2. Various alternative implementations may be practiced according to the present disclosure. In an alternative example, the first portion of the respective gate electrode of the respective transistor in the respective scan unit is in the second conductive layer Gate2, and the second portion of the respective gate electrode of the respective transistor in the respective scan unit is in a third conductive layer. In another alternative example, the first portion of the respective gate electrode of the respective transistor in the respective scan unit is in the light shield layer LSL, and the second portion of the respective gate electrode of the respective transistor in the respective scan unit is in a second conductive layer Gate2.

In some embodiments, a respective active layer of the respective transistor in the respective scan unit is on a side of the first portion of the respective gate electrode of the respective transistor in the respective scan unit away from the base substrate BS, Optionally, the second portion of the respective gate electrode of the respective transistor in the respective scan unit is on a side of the respective active layer of the respective transistor in the respective scan unit away from the first portion of the respective gate electrode of the respective transistor in the respective scan unit.

In alternative examples, the second portion of the respective gate electrode of the respective transistor in the respective scan unit is on a side of the first portion of the respective gate electrode of the respective transistor in the respective scan unit away from the base substrate BS. Optionally, a respective active layer of the respective transistor in the respective scan unit is on a side of the second portion of the respective gate electrode of the respective transistor in the respective scan unit away from the first portion of the respective gate electrode of the respective transistor in the respective scan unit.

In alternative examples, the first portion of the respective gate electrode of the respective transistor in the respective scan unit is on a side of the second portion of the respective gate electrode of the respective transistor in the respective scan unit away from the base substrate BS. Optionally, a respective active layer of the respective gate electrode of the respective transistor in the respective scan unit is on a side of the second portion of the respective gate electrode of the respective transistor in the respective scan unit away from the base substrate, and on a side of the first portion of the respective gate electrode of the respective transistor in the respective scan unit closer to the base substrate.

In some embodiments, an orthographic projection of the second portion of the respective gate electrode of the respective transistor in the respective scan unit on the base substrate at least partially overlaps with an orthographic projection of the first portion of the respective gate electrode of the respective transistor in the respective scan unit on the base substrate. Optionally, the orthographic projection of the second portion of the respective gate electrode of the respective transistor in the respective scan unit on the base substrate substantially overlaps with (e.g., at least 80% overlaps with, at least 85% overlaps with, at least 90% overlaps with, at least 95% overlaps with, at least 99% overlaps with, or completely overlaps with) the orthographic projection of the first portion of the respective gate electrode of the respective transistor in the respective scan unit on the base substrate.

In some embodiments, an orthographic projection of the respective active layer of the respective transistor in the respective scan unit on the base substrate at least partially overlaps with the orthographic projection of the first portion of the respective gate electrode of the respective transistor in the respective scan unit on the base substrate, and at least partially overlaps with the orthographic projection of the second portion of the respective gate electrode of the respective transistor in the respective scan unit on the base substrate.

In some embodiments, first portions of respective gate electrodes of transistors in the respective scan unit are configured to be provided with a same signal. Optionally, the first portions of respective gate electrodes of transistors in the respective scan unit are configured to be provided with a power supply signal (e.g., the third power supply signal provided by the third power supply signal line VGLL2).

In some embodiments, first portions of respective gate electrodes of transistors in the respective scan unit are parts of a unitary structure. For example, the first portion G1-1 of a gate electrode of the first transistor, the first portion G2-1 of a gate electrode of the second transistor, the first portion G3-1 of a gate electrode of the third transistor, the first portion G4-1 of a gate electrode of the fourth transistor, the first portion G5-1 of a gate electrode of the fifth transistor, the first portion G6-1 of a gate electrode of the sixth transistor, the first portion G7-1 of a gate electrode of the seventh transistor, the first portion G8-1 of a gate electrode of the eighth transistor, the first portion G9-1 of a gate electrode of the ninth transistor, and the first portion G10-1 of a gate electrode of the tenth transistor are interconnected and are parts of a unitary structure. Referring to FIG. 5A, FIG. 5C, FIG. 5F, and FIG. 6, the unitary structure comprising the first portions of the respective gate electrodes of the transistors in the respective scan unit is in a layer different from the third power supply line VGLL2. In one example, the third power supply line VGLL2 is connected to the unitary structure comprising the first portions of the respective gate electrodes of the transistors in the respective scan unit, e.g., through a via extending through the passivation layer PVX, the second gate insulating layer GI2, and the first gate insulating layer GI1.

Figure 7:
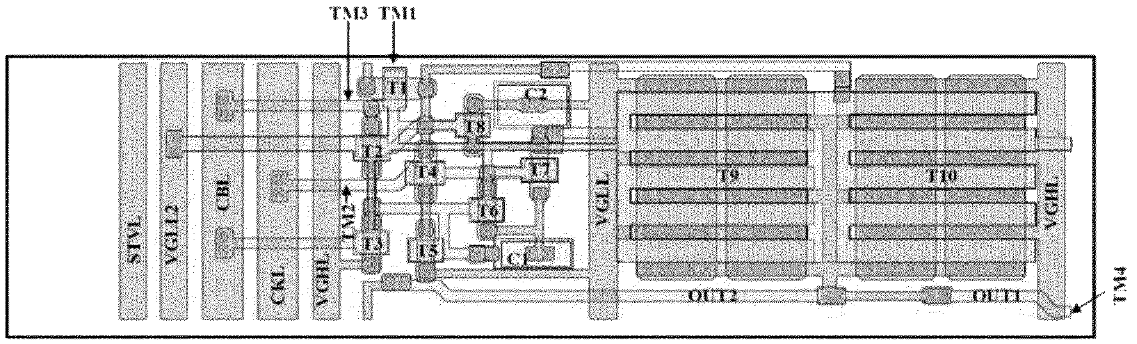
FIG. 7 is a diagram illustrating the structure of a respective scan unit of a scan circuit in some embodiments according to the present disclosure.

In the example depicted in FIG. 5A to FIG. 5F, the start signal line STVL spaces apart the third power supply line VGLL2 from the transistors of the respective scan unit. Various alternative implementations may be practiced according to the present disclosure. FIG. 7 is a diagram illustrating the structure of a respective scan unit of a scan circuit in some embodiments according to the present disclosure. Referring to FIG. 7, in some embodiments, the third power supply line VGLL2 spaces apart the start signal line STVL from the transistors of the respective scan unit.

In the example depicted in FIG. 5A to FIG. 5F, the third power supply line VGLL2 is in a same layer as the start signal line STVL, the first clock signal line CKL, the second clock signal line CBL, the first power supply line VGLL, and the second power supply line VGHL. As used herein, the term "same layer" refers to the relationship between the layers simultaneously formed in the same step. In one example, the third power supply line VGLL2 and the first power supply line VGLL are in a same layer when they are formed as a result of one or more steps of a same patterning process performed in a material deposited in a same deposition process. In another example, the third power supply line VGLL2 and the first power supply line VGLL can be formed in a same layer by simultaneously performing the step of forming the third power supply line VGLL2 and the step of forming the first power supply line VGLL. The term "same layer" does not always mean that the thickness of the layer or the height of the layer in a cross-sectional view is the same.

Figure 8A:
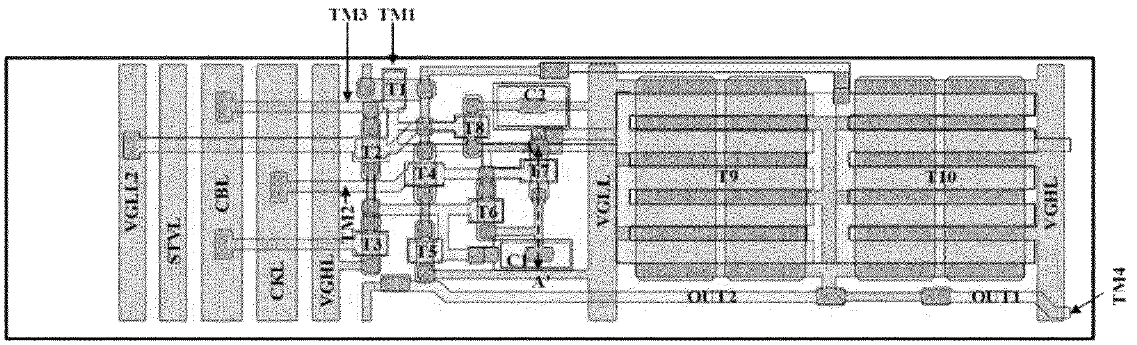
FIG. 8A is a diagram illustrating the structure of a respective scan unit of a scan circuit in some embodiments according to the present disclosure.
Figure 8B:
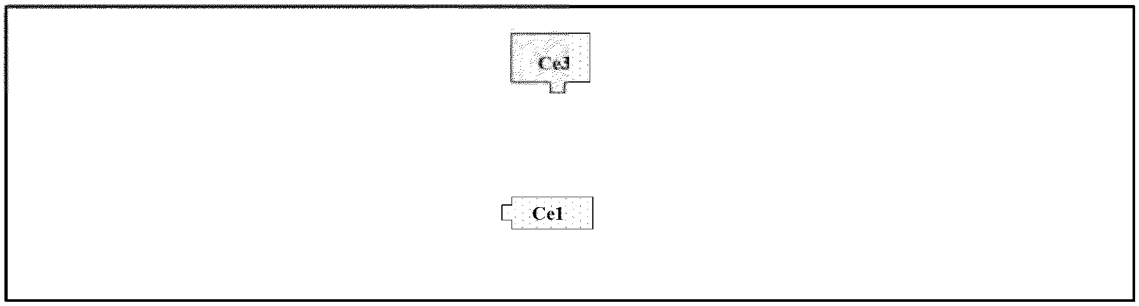
FIG. 8B is a diagram illustrating the structure of a light shield layer in the respective scan unit depicted in FIG. 8A.
Figure 8C:
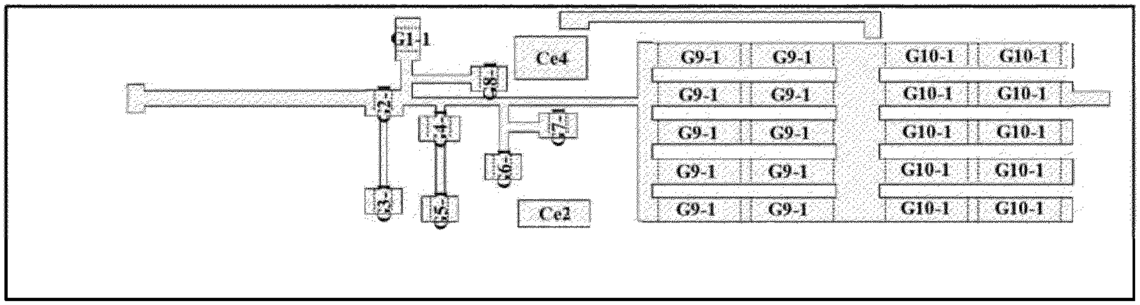
FIG. 8C is a diagram illustrating the structure of a first conductive layer in the respective scan unit depicted in FIG. 8A.

In some embodiments, the third power supply line VGLL2 is in a layer different from at least one of the start signal line STVL, the first clock signal line CKL, the second clock signal line CBL, the first power supply line VGLL, or the second power supply line VGHL. FIG. 8A is a diagram illustrating the structure of a respective scan unit of a scan circuit in some embodiments according to the present disclosure. FIG. 8B is a diagram illustrating the structure of a light shield layer in the respective scan unit depicted in FIG. 8A. FIG. 8C is a diagram illustrating the structure of a first conductive layer in the respective scan unit depicted in FIG.

Figure 8D:
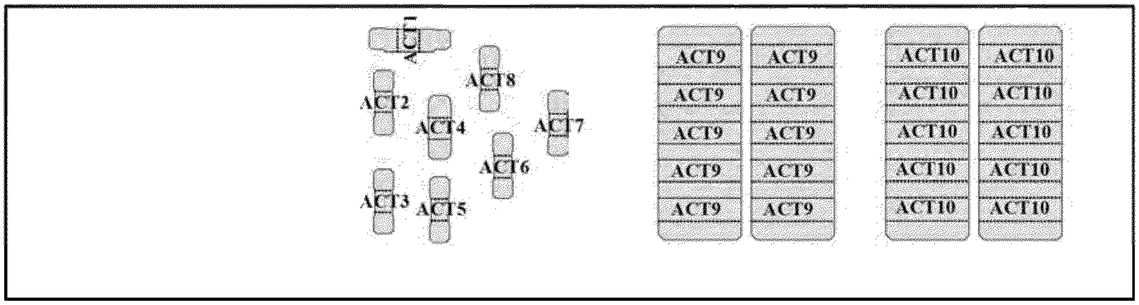
FIG. 8D is a diagram illustrating the structure of a semiconductor material layer in the respective scan unit depicted in FIG. 8A.
Figure 8E:
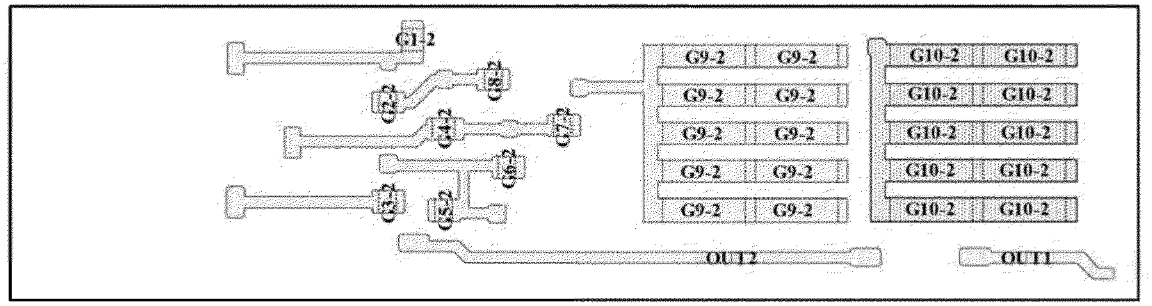
FIG. 8E is a diagram illustrating the structure of a second conductive layer in the respective scan unit depicted in FIG. 8A.
Figure 8F:
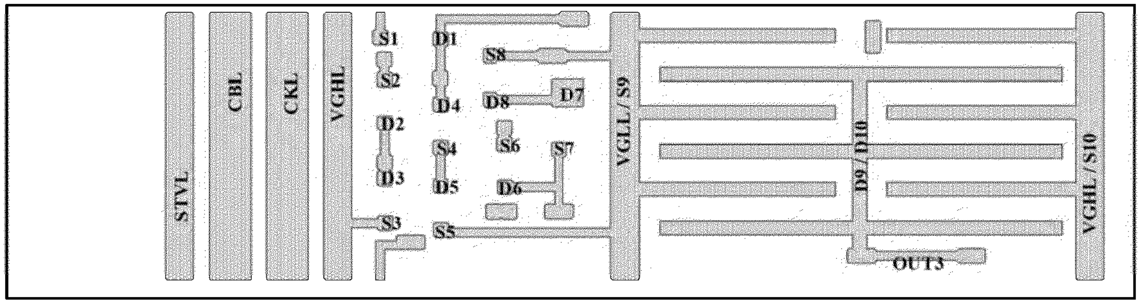
FIG. 8F is a diagram illustrating the structure of a first signal line layer in the respective scan unit depicted in FIG. 8A.
Figure 8G:
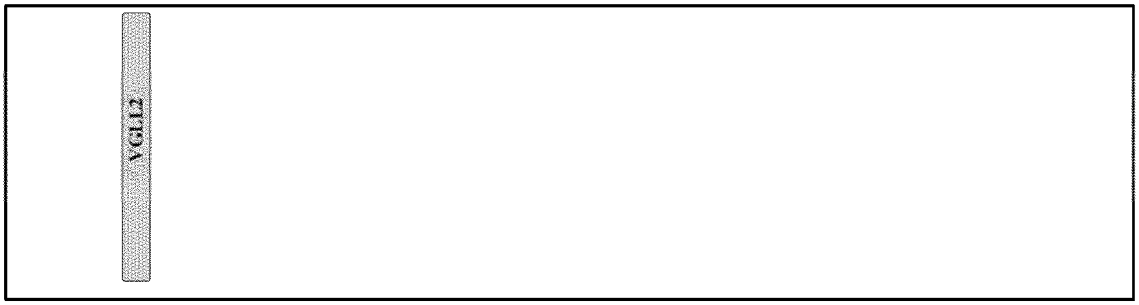
FIG. 8G is a diagram illustrating the structure of a second signal line layer in the respective scan unit depicted in FIG. 8A.

8A. FIG. 8D is a diagram illustrating the structure of a semiconductor material layer in the respective scan unit depicted in FIG. 8A. FIG. 8E is a diagram illustrating the structure of a second conductive layer in the respective scan unit depicted in FIG. 8A. FIG. 8F is a diagram illustrating the structure of a first signal line layer in the respective scan unit depicted in FIG. 8A. FIG. 8G is a diagram illustrating the structure of a second signal line layer in the respective scan unit depicted in FIG. 8A. Referring to FIG. 8A to FIG. 8G, the array substrate in some embodiments further includes a second signal line layer on a side of the first signal line layer away from the base substrate.

Referring to FIG. 8A and FIG. 8B, in some embodiments, the light shield layer LSL includes a first capacitor electrode Ce1 of the first capacitor C1 and a third capacitor electrode Ce3 of the second capacitor C2.

Referring to FIG. 8A and FIG. 8C, in some embodiments, the first conductive layer Gate1 includes a second capacitor electrode Ce2 of the first capacitor C1, a fourth capacitor electrode Ce4 of the second capacitor C2, and a first portion of a respective gate electrode of a respective transistor.

Referring to FIG. 8A and FIG. 8D, in some embodiments, the semiconductor material layer SML includes active layers of transistors in the respective scan unit.

Referring to FIG. 8A and FIG. 8E, in some embodiments, the second conductive layer Gate2 includes a second portion of a respective gate electrode of a respective transistor, a first output signal line OUT1 configured to transmit an output signal from the respective scan unit to the fourth terminal TM4, and a second output signal line OUT2 configured to transmit the output signal from the respective scan unit to a first terminal in a scan unit in a next stage.

Referring to FIG. 8A and FIG. 8F, the first signal line layer SD1 in some embodiments includes a start signal line STVL, a first clock signal line CKL, a second clock signal line CBL, a first power supply line VGLL, a second power supply line VGHL, and a third output signal line OUT3 connected to second electrodes of the ninth transistor and the tenth transistor.

Referring to FIG. 8A and FIG. 8G, the second signal line layer SD2 in some embodiments includes a third power supply line VGLL2. The third power supply line VGLL2 is connected to a unitary structure comprising the first portions of the respective gate electrodes of the transistors in the respective scan unit in the first conductive layer.

Figure 9A:
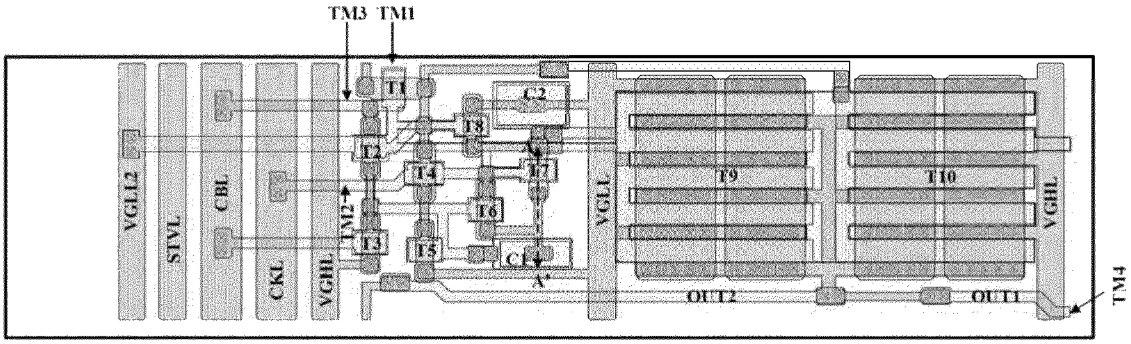
FIG. 9A is a diagram illustrating the structure of a respective scan unit of a scan circuit in some embodiments according to the present disclosure.
Figure 9B:
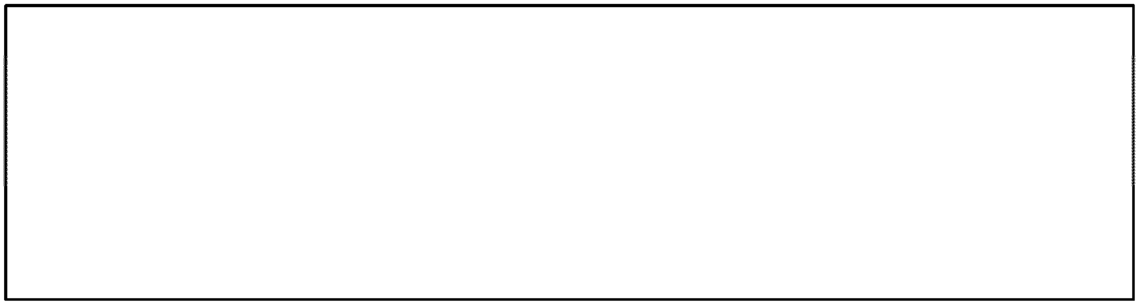
FIG. 9B is a diagram illustrating the structure of a light shield layer in the respective scan unit depicted in FIG. 9A.
Figure 9C:
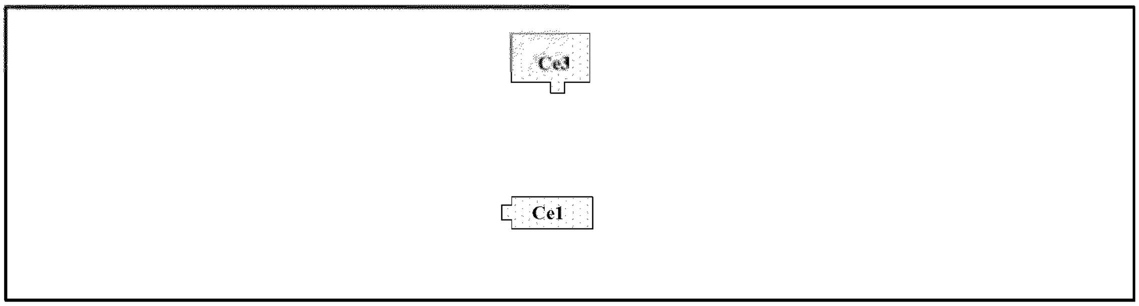
FIG. 9C is a diagram illustrating the structure of a first conductive layer in the respective scan unit depicted in FIG. 9A.
Figure 9D:
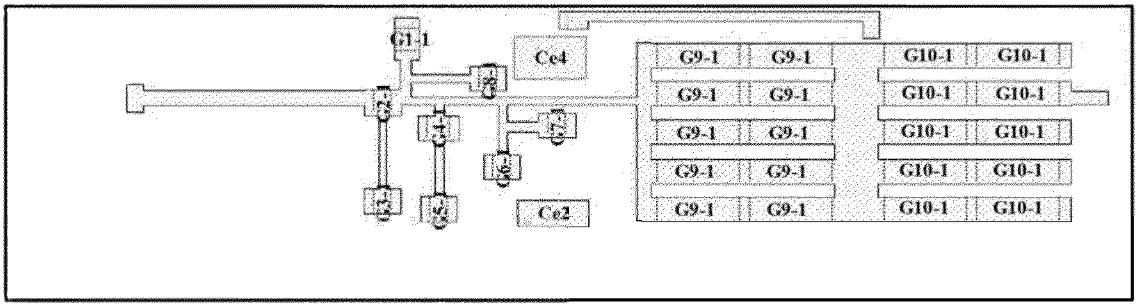
FIG. 9D is a diagram illustrating the structure of a second conductive layer in the respective scan unit depicted in FIG. 9A.
Figure 9E:
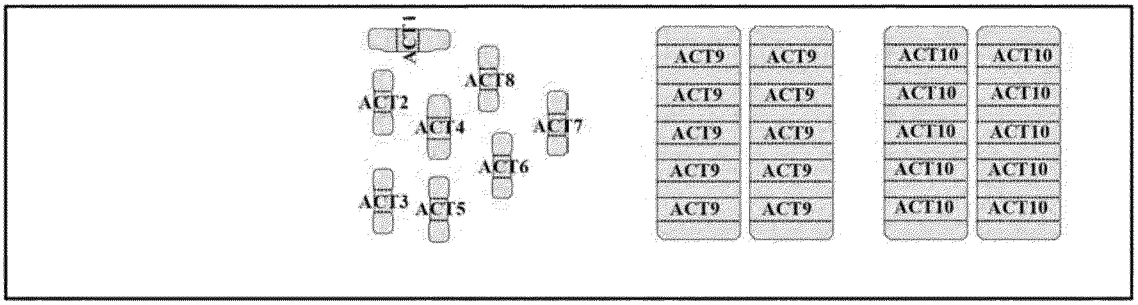
FIG. 9E is a diagram illustrating the structure of a semiconductor material layer in the respective scan unit depicted in FIG. 9A.
Figure 9F:
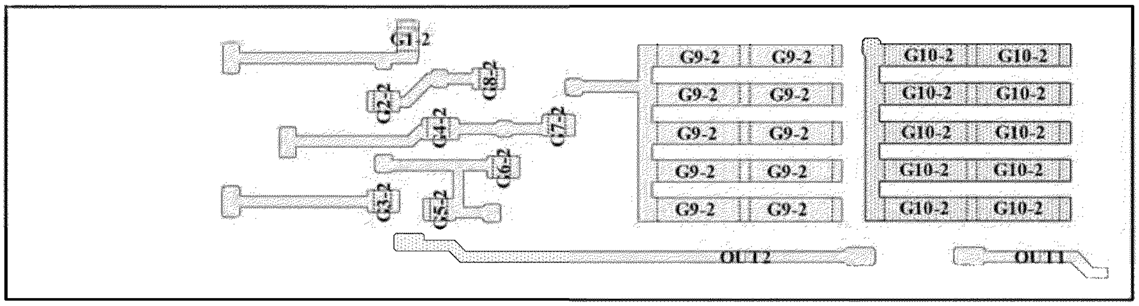
FIG. 9F is a diagram illustrating the structure of a third conductive layer in the respective scan unit depicted in FIG. 9A.
Figure 9G:
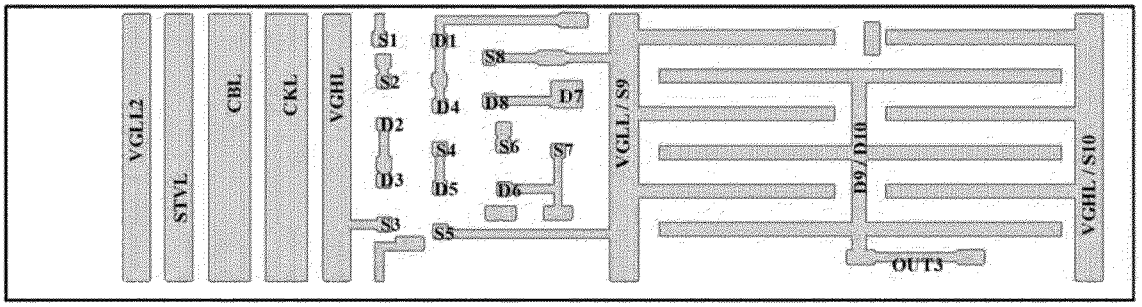
FIG. 9G is a diagram illustrating the structure of a first signal line layer in the respective scan unit depicted in FIG. 9A.

Various alternative implementations may be practiced according to the present disclosure. FIG. 9A is a diagram illustrating the structure of a respective scan unit of a scan circuit in some embodiments according to the present disclosure. FIG. 9B is a diagram illustrating the structure of a light shield layer in the respective scan unit depicted in FIG. 9A. FIG. 9C is a diagram illustrating the structure of a first conductive layer in the respective scan unit depicted in FIG. 9A. FIG. 9D is a diagram illustrating the structure of a second conductive layer in the respective scan unit depicted in FIG. 9A. FIG. 9E is a diagram illustrating the structure of a semiconductor material layer in the respective scan unit depicted in FIG. 9A. FIG. 9F is a diagram illustrating the structure of a third conductive layer in the respective scan unit depicted in FIG. 9A. FIG. 9G is a diagram illustrating the structure of a first signal line layer in the respective scan unit depicted in FIG. 9A.

Referring to FIG. 9A and FIG. 9B, in some embodiments, the light shield layer LSL is absent of any capacitor electrode of the first capacitor or the second capacitor.

Referring to FIG. 9A and FIG. 9C, in some embodiments, the first conductive layer Gate1 includes a first capacitor electrode Ce1 of the first capacitor C1 and a third capacitor electrode Ce3 of the second capacitor C2.

Referring to FIG. 9A and FIG. 9D, in some embodiments, the second conductive layer Gate2 includes a second capacitor electrode Ce2 of the first capacitor C1, a fourth capacitor electrode Ce4 of the second capacitor C2, and a first portion of a respective gate electrode of a respective transistor.

Referring to FIG. 9A and FIG. 9E, in some embodiments, the semiconductor material layer SML includes active layers of transistors in the respective scan unit.

Referring to FIG. 9A and FIG. 9F, in some embodiments, the third conductive layer Gate3 includes a second portion of a respective gate electrode of a respective transistor, a first output signal line OUT1 configured to transmit an output signal from the respective scan unit to the fourth terminal TM4, and a second output signal line OUT2 configured to transmit the output signal from the respective scan unit to a first terminal in a scan unit in a next stage.

Referring to FIG. 9A and FIG. 9G, the first signal line layer SD1 in some embodiments includes a start signal line STVL, a first clock signal line CKL, a second clock signal line CBL, a first power supply line VGLL, a second power supply line VGHL, a third power supply line VGLL2, and a third output signal line OUT3 connected to second electrodes of the ninth transistor and the tenth transistor. The third output signal line OUT3 is further connected to the first output signal line OUT1 and connected to the second output signal line OUT2.

Figure 10:
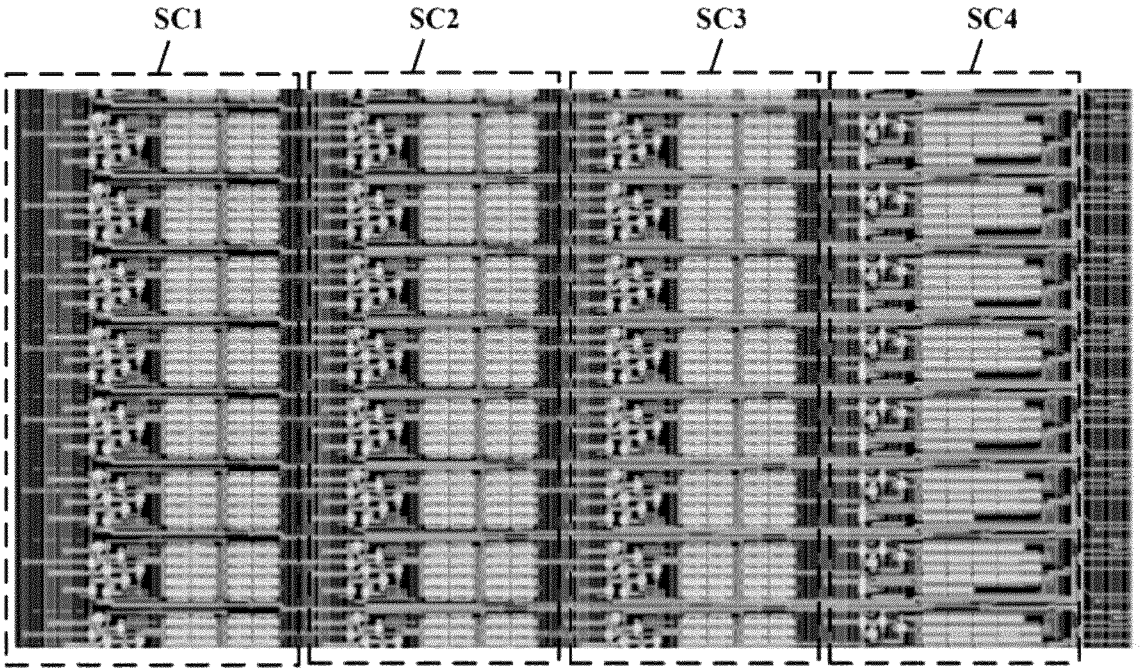
FIG. 10 is a diagram illustrating a layout of a plurality of scan circuits in an array substrate in some embodiments according to the present disclosure.

FIG. 10 is a diagram illustrating a layout of a plurality of scan circuits in an array substrate in some embodiments according to the present disclosure. Referring to FIG. 10, in some embodiments, the array substrate includes a plurality of scan circuits, e.g., a first scan circuit SC1, a second scan circuit SC2, a third scan circuit SC3, and a fourth scan circuit SC4. Examples of scan circuits include a light emitting control signal generating circuit configured to generate light emitting control signals for subpixels in the array substrate, a reset control signal generating circuit configured to generate reset control signals for subpixels in the array substrate, and a gate scanning signal generating circuit configured to generate gate scanning signals for subpixels in the array substrate. In some embodiments, each of the plurality of scan circuits includes a plurality of stages of cascaded scan units. Optionally, the plurality of stages of cascaded scan units are configured to provide a plurality of control signals (e.g., gate scanning signals, reset control signals, or light emission control signals) to a plurality of rows of subpixels.

Figure 11:
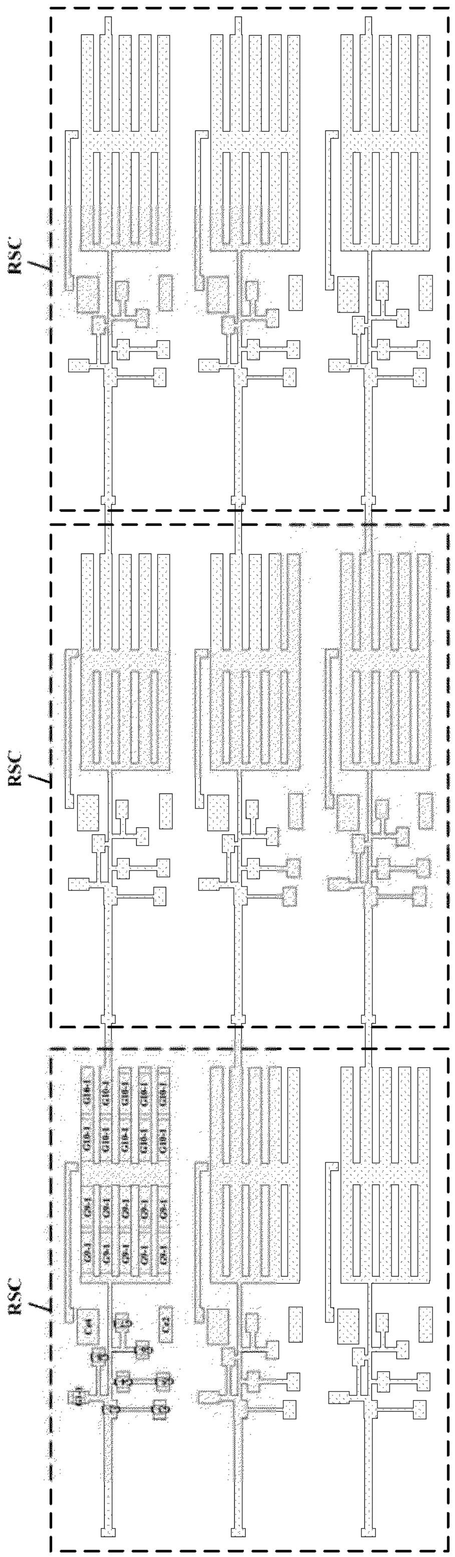
FIG. 11 is a diagram illustrating the structure of a unitary structure comprising first portions of respective gate electrodes of transistors in a plurality of scan circuits in an array substrate in some embodiments according to the present disclosure.

FIG. 11 is a diagram illustrating the structure of a unitary structure comprising first portions of respective gate electrodes of transistors in a plurality of scan circuits in an array substrate in some embodiments according to the present disclosure. Referring to FIG. 11, in some embodiments, the array substrate includes a plurality of scan circuits RSC. In some embodiments, first portions of respective gate electrodes of transistors of a plurality of scan units in a same stage (e.g., in a same row) respectively from the plurality of scan circuits RSC are parts of a unitary structure.

Figure 12:
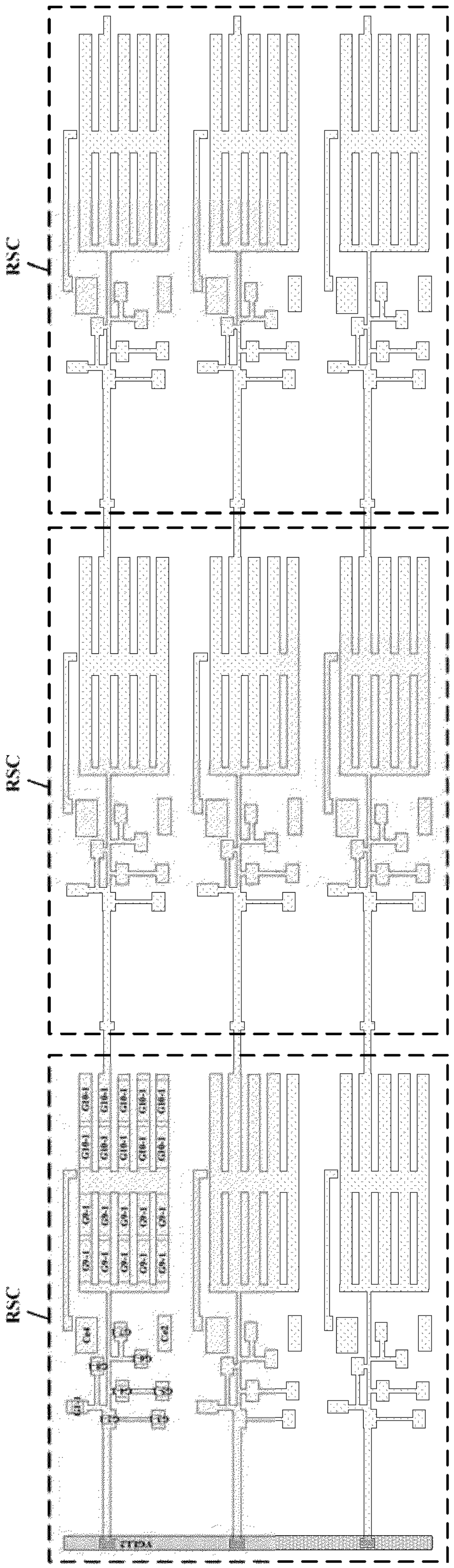
FIG. 12 is a diagram illustrating connection between a third power supply line and a unitary structure comprising first portions of respective gate electrodes of transistors in a plurality of scan circuits in an array substrate in some embodiments according to the present disclosure.

FIG. 12 is a diagram illustrating connection between a third power supply line and a unitary structure comprising first portions of respective gate electrodes of transistors in a plurality of scan circuits in an array substrate in some embodiments according to the present disclosure. Referring to FIG. 11 and FIG. 12, in some embodiments, the unitary structure comprising the first portions of the respective gate electrodes of the transistors of the plurality of scan units in the same stage (e.g., in the same row) respectively from the plurality of scan circuits RSC are connected to a third power supply line VGLL2 in a peripheral area of the array substrate. Optionally, a plurality of unitary structures are commonly connected to a single third power supply line in the peripheral area of the array substrate; wherein a respective unitary structure of the plurality of unitary structures includes the first portions of the respective gate electrodes of the transistors of the plurality of scan units in the same respective stage (e.g., in the same respective row) respectively from the plurality of scan circuits RSC.

Figure 13A:
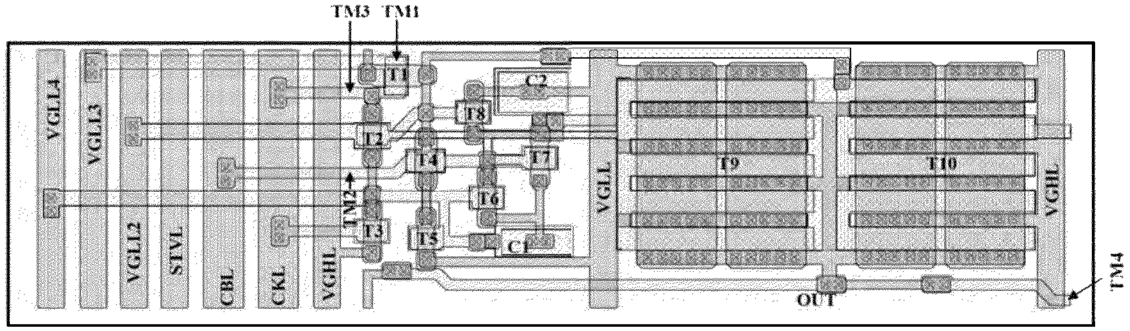
FIG. 13A is a diagram illustrating the structure of a respective scan unit of a scan circuit in some embodiments according to the present disclosure.
Figure 13B:
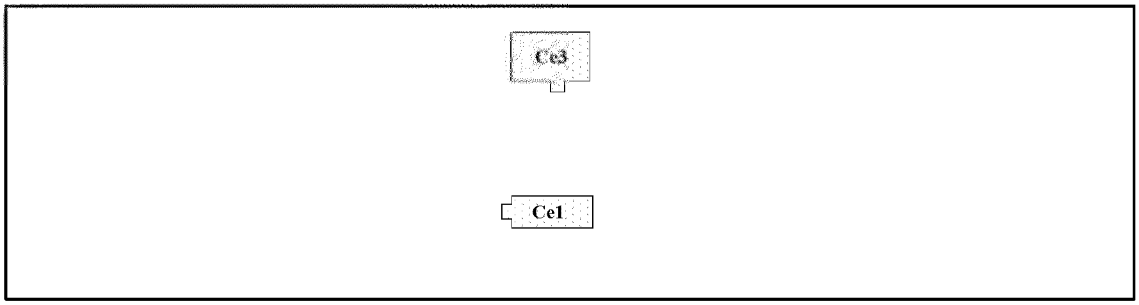
FIG. 13B is a diagram illustrating the structure of a light shield layer in the respective scan unit depicted in FIG. 13A.
Figure 13C:
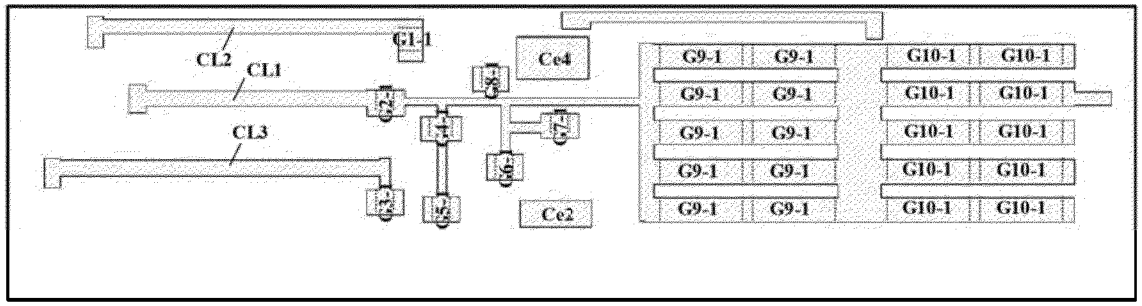
FIG. 13C is a diagram illustrating the structure of a first conductive layer in the respective scan unit depicted in FIG. 13A.
Figure 13D:
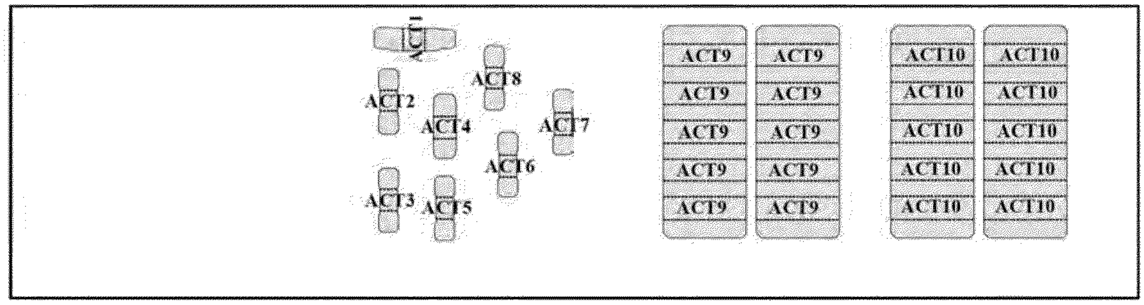
FIG. 13D is a diagram illustrating the structure of a semiconductor material second conductive layer in the respective scan unit depicted in FIG. 13A.
Figure 13E:
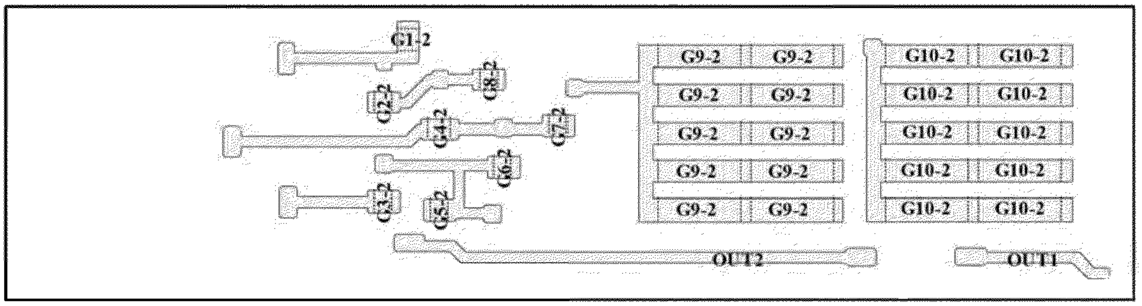
FIG. 13E is a diagram illustrating the structure of a second conductive layer in the respective scan unit depicted in FIG. 13A.
Figure 13F:
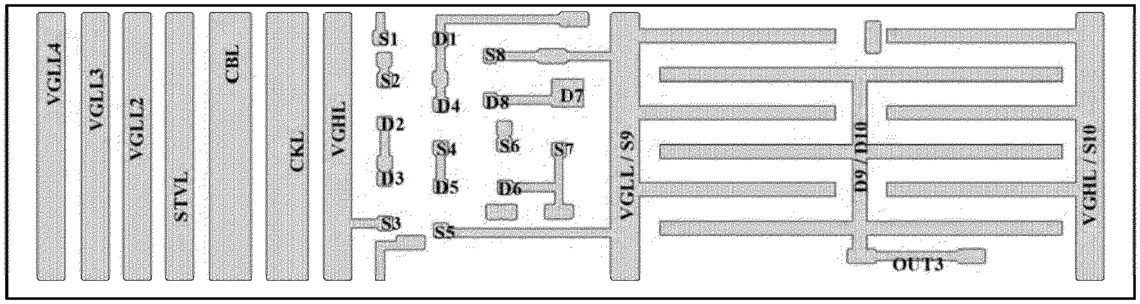
FIG. 13F is a diagram illustrating the structure of a first signal line layer in the respective scan unit depicted in FIG. 13A.

Various alternative implementations may be practiced according to the present disclosure. FIG. 13A is a diagram illustrating the structure of a respective scan unit of a scan circuit in some embodiments according to the present disclosure. FIG. 13B is a diagram illustrating the structure of a light shield layer in the respective scan unit depicted in FIG. 13A. FIG. 13C is a diagram illustrating the structure of a first conductive layer in the respective scan unit depicted in FIG. 13A. FIG. 13D is a diagram illustrating the structure of a semiconductor material layer in the respective scan unit depicted in FIG. 13A. FIG. 13E is a diagram illustrating the structure of a second conductive layer in the respective scan unit depicted in FIG. 13A. FIG. 13F is a diagram illustrating the structure of a first signal line layer in the respective scan unit depicted in FIG. 13A.

Referring to FIG. 13A and FIG. 13B, in some embodiments, the light shield layer LSL includes a first capacitor electrode Ce1 of the first capacitor C1 and a third capacitor electrode Ce3 of the second capacitor C2.

Referring to FIG. 13A and FIG. 13C, in some embodiments, the first conductive layer Gate1 includes a second capacitor electrode Ce2 of the first capacitor C1, a fourth capacitor electrode Ce4 of the second capacitor C2, and a first portion of a respective gate electrode of a respective transistor. In one example, the first conductive layer Gate1 includes a second capacitor electrode Ce2 of the first capacitor C1, a fourth capacitor electrode Ce4 of the second capacitor C2, a first portion G1-1 of a gate electrode of the first transistor, a first portion G2-1 of a gate electrode of the second transistor, a first portion G3-1 of a gate electrode of the third transistor, a first portion G4-1 of a gate electrode of the fourth transistor, a first portion G5-1 of a gate electrode of the fifth transistor, a first portion G6-1 of a gate electrode of the sixth transistor, a first portion G7-1 of a gate electrode of the seventh transistor, a first portion G8-1 of a gate electrode of the eighth transistor, a first portion G9-1 of a gate electrode of the ninth transistor, and a first portion G10-1 of a gate electrode of the tenth transistor.

In some embodiments, first portions of respective gate electrodes of the second transistor T2, the fourth transistor T4, the fifth transistor T5, the sixth transistor T6, the seventh transistor T7, the eighth transistor T8, the ninth transistor T9, and the tenth transistor T10 in the respective scan unit are parts of a unitary structure. For example, the first portion G2-1 of a gate electrode of the second transistor, the first portion G4-1 of a gate electrode of the fourth transistor, the first portion G5-1 of a gate electrode of the fifth transistor, the first portion G6-1 of a gate electrode of the sixth transistor, the first portion G7-1 of a gate electrode of the seventh transistor, the first portion G8-1 of a gate electrode of the eighth transistor, the first portion G9-1 of a gate electrode of the ninth transistor, and the first portion G10-1 of a gate electrode of the tenth transistor are interconnected and are parts of a unitary structure.

In some embodiments, a first portion G1-1 of a gate electrode of the first transistor T1 is spaced apart from the unitary structure.

In some embodiments, a first portion G3-1 of a gate electrode of the third transistor T3 is spaced apart from the unitary structure.

In some embodiments, the unitary structure further includes a first connecting line CL1 (as part of the unitary structure) connecting the first portions of respective gate electrodes of the second transistor T2, the fourth transistor T4, the fifth transistor T5, the sixth transistor T6, the seventh transistor T7, the eighth transistor T8, the ninth transistor T9, and the tenth transistor T10 with a third power supply line.

In some embodiments, the respective scan unit further comprising a second connecting line CL2 connecting the first portion G1-1 of the gate electrode of the first transistor T1 with a fourth power supply line. Optionally, the second connecting line CL2 and the first portion G1-1 of the gate electrode of the first transistor T1 are part of another unitary structure.

In some embodiments, the respective scan unit further comprising a third connecting line CL3 connecting the first portion G3-1 of the gate electrode of the third transistor T3 with a fifth power supply line. Optionally, the second connecting line CL2 and the first portion G3-1 of the gate electrode of the third transistor T3 are part of another unitary structure.

Referring to FIG. 13A and FIG. 13D, in some embodiments, the semiconductor material layer SML includes active layers of transistors in the respective scan unit. FIG. 13E is annotated with labels indicating the active layers of the transistors in the respective scan unit, for example, an active layer ACT1 of the first transistor, an active layer ACT2 of the second transistor, an active layer ACT3 of the third transistor, an active layer ACT4 of the fourth transistor, an active layer ACT5 of the fifth transistor, an active layer ACT6 of the sixth transistor, an active layer ACT7 of the seventh transistor, an active layer ACT8 of the eighth transistor, an active layer ACT9 of the ninth transistor, and an active layer ACT10 of the tenth transistor. Various appropriate semiconductor materials may be used for making the semiconductor material layer SML. Examples of the semiconductor materials for making the semiconductor material layer SML include metal oxide-based semiconductor material such as indium gallium zinc oxide and metal oxynitride-based semiconductor materials such as zinc oxynitride.

Referring to FIG. 13A and FIG. 13E, in some embodiments, the second conductive layer Gate2 includes a second portion of a respective gate electrode of a respective transistor. In one example, the second conductive layer Gate2 includes a second portion G1-2 of a gate electrode of the first transistor, a second portion G2-2 of a gate electrode of the second transistor, a second portion G3-2 of a gate electrode of the third transistor, a second portion G4-2 of a gate electrode of the fourth transistor, a second portion G5-2 of a gate electrode of the fifth transistor, a second portion G6-2 of a gate electrode of the sixth transistor, a second portion G7-2 of a gate electrode of the seventh transistor, a second portion G8-2 of a gate electrode of the eighth transistor, a second portion G9-2 of a gate electrode of the ninth transistor, and a second portion G10-2 of a gate electrode of the tenth transistor. In some embodiments, the second conductive layer Gate2 further includes a first output signal line OUT1 configured to transmit an output signal from the respective scan unit to the fourth terminal TM4, and a second output signal line OUT2 configured to transmit the output signal from the respective scan unit to a first terminal in a scan unit in a next stage.

Referring to FIG. 13A and FIG. 13F, the first signal line layer SD1 in some embodiments includes a start signal line STVL, a first clock signal line CKL, a second clock signal line CBL, a first power supply line VGLL, a second power supply line VGHL, a third power supply line VGLL2, a fourth power supply line VGLL3, and a fifth power supply line VGLL4. FIG. 13F is annotated with labels indicating first electrodes and second electrodes of transistors in the respective scan unit. For example, the first transistor includes a first electrode S1 and a second electrode D1, the second transistor includes a first electrode S2 and a second electrode D2, the third transistor includes a first electrode S3 and a second electrode D3, the fourth transistor includes a first electrode S4 and a second electrode D4, the fifth transistor includes a first electrode S5 and a second electrode D5, the sixth transistor includes a first electrode S6 and a second electrode D6, the seventh transistor includes a first electrode S7 and a second electrode D7, the eighth transistor includes a first electrode S8 and a second electrode D8, the ninth transistor includes a first electrode S9 and a second electrode D9, the tenth transistor includes a first electrode S10 and a second electrode D10. In some embodiments, the first signal line layer SD1 further includes a third output signal line OUT3 connected to second electrodes of the ninth transistor and the tenth transistor. The third output signal line OUT3 is further connected to the first output signal line OUT1 and connected to the second output signal line OUT2.

Referring to FIG. 13A, FIG. 13C, and FIG. 13F, the third power supply line VGLL2 is connected to the first connecting line CL1. The third power supply line VGLL2 is configured to provide a third power supply signal to the first portions of respective gate electrodes of the second transistor T2, the fourth transistor T4, the fifth transistor T5, the sixth transistor T6, the seventh transistor T7, the eighth transistor T8, the ninth transistor T9, and the tenth transistor T10, through the first connecting line CL1.

In some embodiments, the fourth power supply line VGLL3 is connected to the second connecting line CL2. The fourth power supply line VGLL3 is configured to provide a fourth power supply signal to the first portion G1-1 of the gate electrode of the first transistor T1, through the fourth power supply line VGLL3.

In some embodiments, the fifth power supply line VGLL4 is connected to the third connecting line CL3. The fifth power supply line VGLL4 is configured to provide a fifth power supply signal to the first portion G3-1 of the gate electrode of the third transistor T3, through the fifth power supply line VGLL4.

In some embodiments, the first power supply line VGLL is configured to provide a first power supply signal, the second power supply line VGHL is configured to provide a second power supply signal, the third power supply line VGLL2 is configured to provide a third power supply signal, the fourth power supply line VGLL3 is configured to provide a fourth power supply signal, and the fifth power supply line VGLL4 is configured to provide a fifth power supply signal. Optionally, a voltage level of the second power supply signal is higher than a voltage level of the first power supply signal. Optionally, a voltage level of the second power supply signal is higher than a voltage level of the third power supply signal. Optionally, a voltage level of the second power supply signal is higher than a voltage level of the fourth power supply signal. Optionally, a voltage level of the second power supply signal is higher than a voltage level of the fifth power supply signal. Optionally, a voltage level of the third power supply signal is higher than a voltage level of the first power supply signal. Optionally, a voltage level of the fourth power supply signal is higher than a voltage level of the first power supply signal. Optionally, a voltage level of the fifth power supply signal is higher than a voltage level of the first power supply signal.

Figure 14:
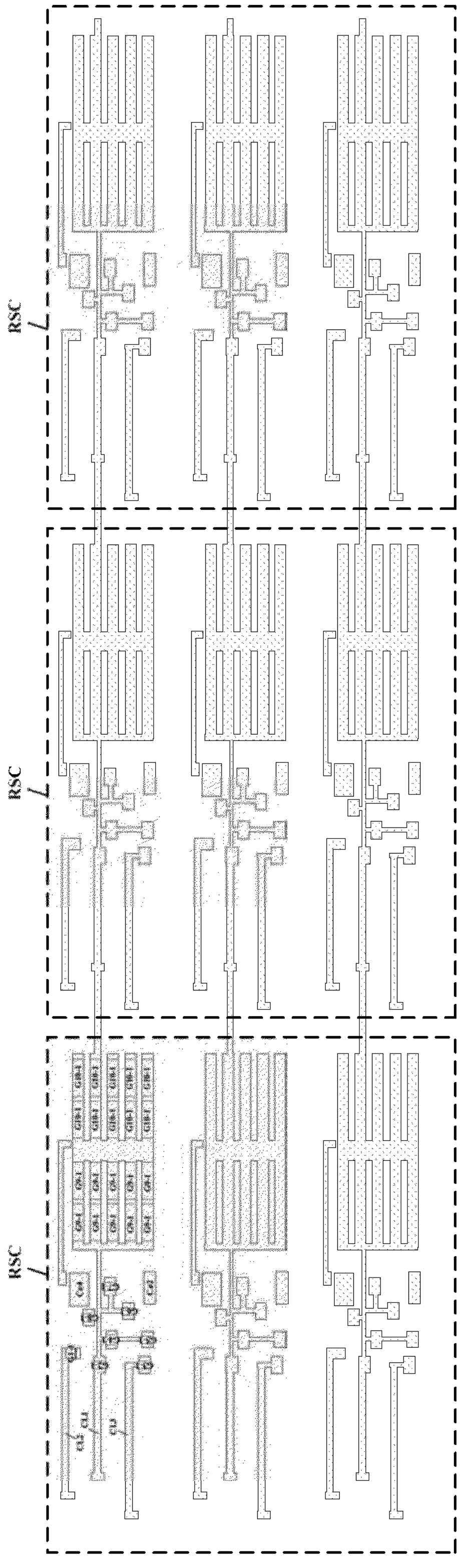
FIG. 14 is a diagram illustrating the structure of a unitary structure comprising first portions of certain gate electrodes of certain transistors in a plurality of scan circuits in an array substrate in some embodiments according to the present disclosure.

FIG. 14 is a diagram illustrating the structure of a unitary structure comprising first portions of certain gate electrodes of certain transistors in a plurality of scan circuits in an array substrate in some embodiments according to the present disclosure. Referring to FIG. 14, in some embodiments, the array substrate includes a plurality of scan circuits RSC. In some embodiments, first portions of gate electrodes of second transistors, fourth transistors, fifth transistors, sixth transistors, seventh transistors, eighth transistors, ninth transistors, and tenth transistors of a plurality of scan units in a same stage (e.g., in a same row) respectively from the plurality of scan circuits RSC are parts of a unitary structure.

Figure 15:
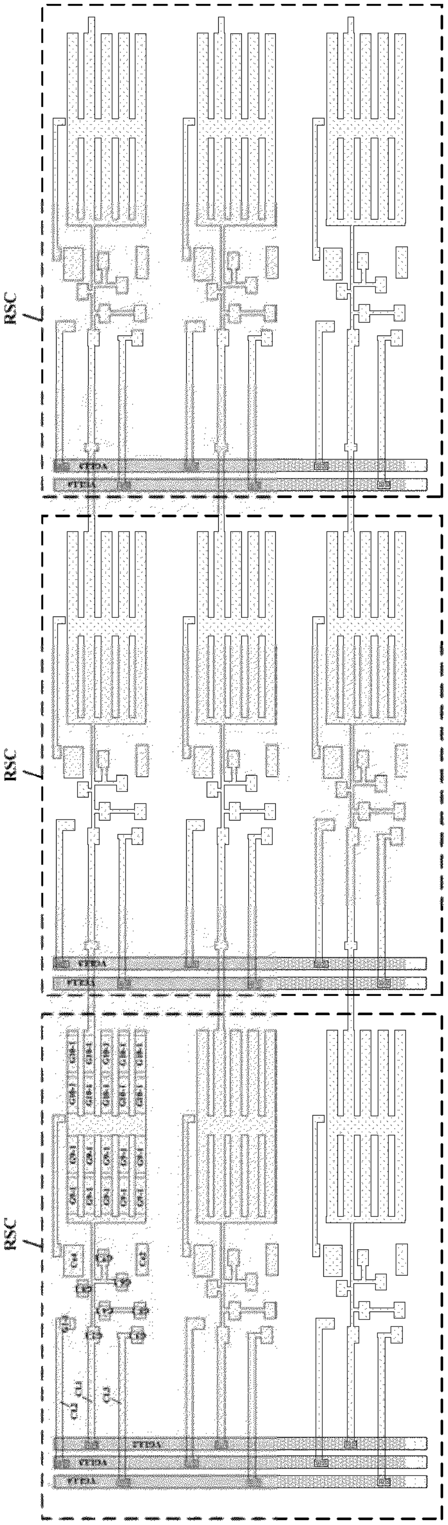
FIG. 15 is a diagram illustrating connection between a third power supply line and a unitary structure comprising first portions of certain gate electrodes of certain transistors in a plurality of scan circuits in an array substrate in some embodiments according to the present disclosure.

FIG. 15 is a diagram illustrating connection between a third power supply line and a unitary structure comprising first portions of certain gate electrodes of certain transistors in a plurality of scan circuits in an array substrate in some embodiments according to the present disclosure. Referring to FIG. 14 and FIG. 15, in some embodiments, the unitary structure comprising the first portions of gate electrodes of the second transistors, the fourth transistors, the fifth transistors, the sixth transistors, the seventh transistors, the eighth transistors, the ninth transistors, and the tenth transistors of the plurality of scan units in the same stage (e.g., in the same row) respectively from the plurality of scan circuits RSC are connected to a third power supply line VGLL2 in a peripheral area of the array substrate. Optionally, a plurality of unitary structures are commonly connected to a single third power supply line in the peripheral area of the array substrate; wherein a respective unitary structure of the plurality of unitary structures includes the first portions of gate electrodes of the second transistors, the fourth transistors, the fifth transistors, the sixth transistors, the seventh transistors, the eighth transistors, the ninth transistors, and the tenth transistors of the plurality of scan units in the same stage (e.g., in the same row) respectively from the plurality of scan circuits RSC.

In another aspect, the present invention provides a display apparatus, including the scan circuit described herein or fabricated by a method described herein, and a display panel having a plurality of light emitting elements. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a micro light emitting diode display apparatus. Optionally, the display apparatus is a mini light emitting diode display apparatus. Optionally, the display apparatus is a quantum dots display apparatus.

Figure 16:
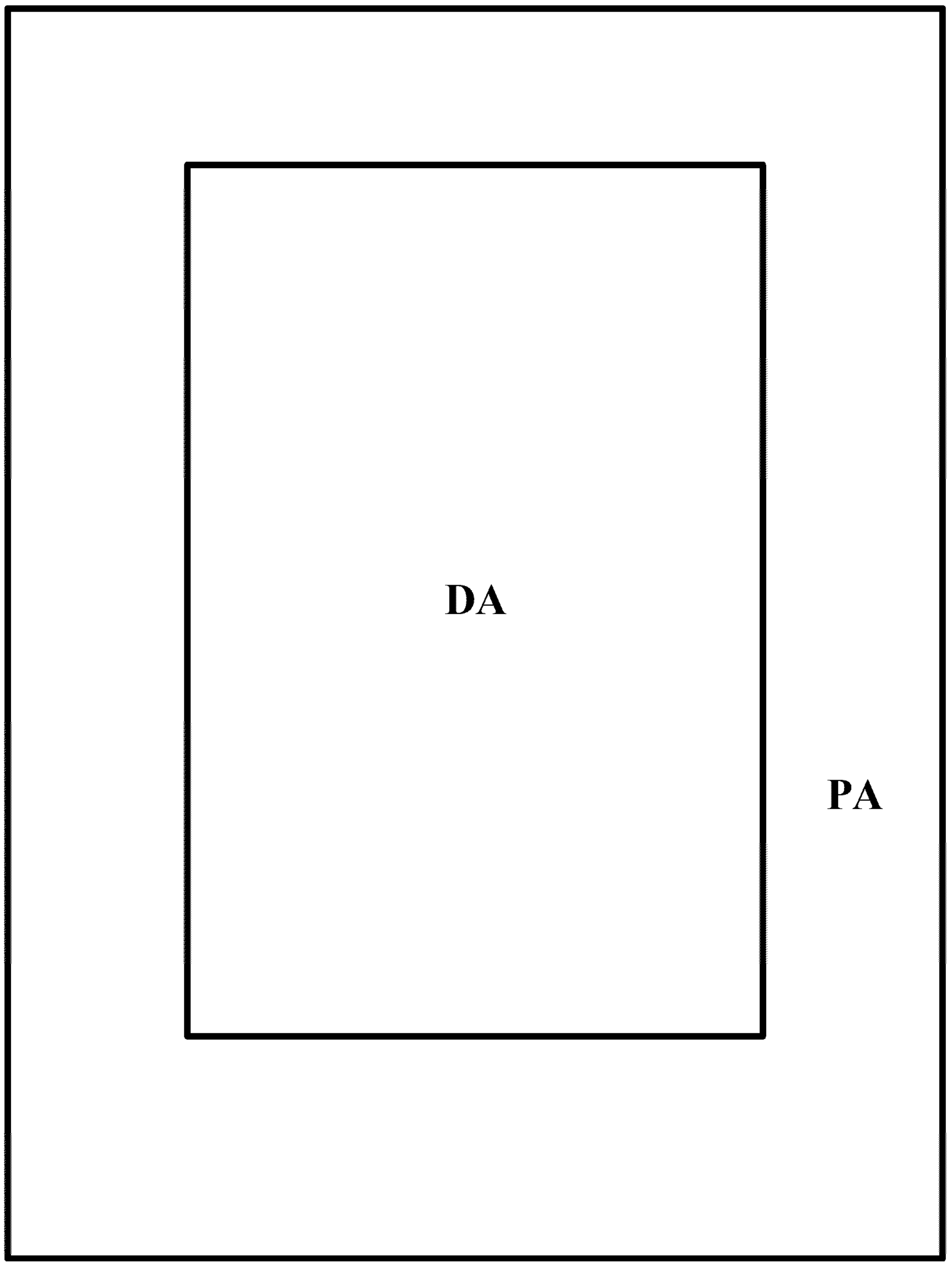
FIG. 16 is a schematic diagram illustrating a display area and a peripheral area in a display panel in some embodiments according to the present disclosure.

FIG. 16 is a schematic diagram illustrating a display area and a peripheral area in a display panel in some embodiments according to the present disclosure. Referring to FIG. 16, in some embodiments, the display apparatus includes a display area DA and a peripheral area PA. As used herein, the term "display area" refers to an area of a display panel where image is actually displayed. Optionally, the display area may include both a subpixel region and an inter-subpixel region. A subpixel region refers to a light emission region of a subpixel, such as a region corresponding to a pixel electrode in a liquid crystal display or a region corresponding to a light emissive layer in an organic light emitting diode display panel. An inter-subpixel region refers to a region between adjacent subpixel regions, such as a region corresponding to a black matrix in a liquid crystal display or a region corresponding a pixel definition layer in an organic light emitting diode display panel. Optionally, the inter-subpixel region is a region between adjacent subpixel regions in a same pixel. Optionally, the inter-subpixel region is a region between two adjacent subpixel regions from two adjacent pixels.

The scan circuit in some embodiments is in the peripheral area. As used herein the term "peripheral area" refers to an area of a display panel where various circuits (for example, the scan circuit) and wires are provided to transmit signals to the display panel. To increase the transparency of the display panel, non-transparent or opaque components of the display panel (e.g., battery, printed circuit board, metal frame), can be disposed in the peripheral area rather than in the display areas.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A scan circuit, comprising a plurality of scan units;

wherein a respective scan unit of the plurality of scan units comprises a plurality of transistors;

a respective gate electrode of a respective transistor of the plurality of transistors comprises a first portion and a second portion in different layers;

first portions of respective gate electrodes of the plurality of transistors in the respective scan unit are configured to be provided with a power supply signal;

second portions of the respective gate electrodes of the plurality of transistors in the respective scan unit are configured to be provided with gate scanning signals, respectively;

first portions of gate electrodes of at least two transistors in the respective scan unit are parts of a unitary structure;

multiple power supply lines, wherein a first power supply line of the multiple power supply lines is configured to provide a power supply signal to a first portion of a gate electrode of at least one transistor in the respective scan unit;

a second power supply line of the multiple power supply lines is configured to provide a power supply signal to first portion of gate electrodes of a group of transistors in the respective scan unit;

a third power supply line, a fourth power supply line, and a fifth power supply line;

wherein the fourth power supply line is connected to, and configured to provide a power supply signal to, a first portion of a gate electrode of a first transistor in the respective scan unit, wherein the fifth power supply line is connected to, and configured to provide a power supply signal to, a first portion of a gate electrode of a third transistor in the respective scan unit, and wherein the third power supply line is connected to, and configured to provide a power supply signal to, a unitary structure comprising first portions of gate electrode of transistors other than the first transistor and the third transistor in the respective scan unit.

2. The scan circuit of claim 1, wherein the first portions of the gate electrodes of the at least two transistors in the respective scan unit are connected to a same power supply signal line.

3. The scan circuit of claim 1, wherein first portions of gate electrodes of the plurality of transistors in the respective scan unit are parts of a unitary structure.

4. The scan circuit of claim 1, wherein first portions of gate electrodes of the plurality of transistors in the respective scan unit are connected to a same power supply signal line.

5. The scan circuit of claim 1, wherein first portions of gate electrodes of the plurality of transistors are in a same layer as at least one capacitor electrode of one or more capacitors in the respective scan unit.

6. The scan circuit of claim 1, wherein the plurality of transistors are a plurality of n-type transistors.

7. The scan circuit of claim 1, wherein active layers of the plurality of transistors in the respective scan unit are in a layer on a side of the first portions away from a base substrate; and the second portions are in a layer on a side of the active layers away from the first portions.

8. The scan circuit of claim 7, wherein one or more power supply lines configured to provide one or more power supply signals to the first portions are on a side of the second portions away from the base substrate.

9. The scan circuit of claim 1, wherein first portions of gate electrodes of the group of transistors in the respective scan unit are parts of a unitary structure.

10. An array substrate comprising a plurality of scan circuits, wherein each scan circuit includes a plurality of scan units;

wherein a respective scan unit of the plurality of scan units comprises a plurality of transistors;

a respective gate electrode of a respective transistor of the plurality of transistors comprises a first portion and a second portion in different layers;

first portions of respective gate electrodes of the plurality of transistors in the respective scan unit are configured to be provided with a power supply signal;

second portions of the respective gate electrodes of the plurality of transistors in the respective scan unit are configured to be provided with gate scanning signals, respectively; and first portions of gate electrodes of at least two transistors in the respective scan unit are parts of a unitary structure;

multiple power supply lines, wherein a first power supply line of the multiple power supply lines is configured to provide a power supply signal to a first portion of a gate electrode of at least one transistor in the respective scan unit;

a second power supply line of the multiple power supply lines is configured to provide a power supply signal to first portion of gate electrodes of a group of transistors in the respective scan unit;

a third power supply line, a fourth power supply line, and a fifth power supply line;

wherein the fourth power supply line is connected to, and configured to provide a power supply signal to, a first portion of a gate electrode of a first transistor in the respective scan unit, wherein the fifth power supply line is connected to, and configured to provide a power supply signal to, a first portion of a gate electrode of a third transistor in the respective scan unit, and wherein the third power supply line is connected to, and configured to provide a power supply signal to, a unitary structure comprising first portions of gate electrode of transistors other than the first transistor and the third transistor in the respective scan unit.

11. The array substrate of claim 10, wherein the unitary structure comprises first portions of gate electrodes of at least two transistors in each of a plurality of scan units in a same stage respectively from the plurality of scan circuits.

12. The array substrate of claim 11, wherein the first portions of the gate electrodes of the at least two transistors in each of a plurality of scan units in a same stage respectively from the plurality of scan circuits are connected to a same power supply signal line.

13. The array substrate of claim 10, wherein the unitary structure comprises first portions of respective gate electrodes of all transistors of a plurality of scan units in a same stage respectively from the plurality of scan circuits.

14. The array substrate of claim 10, wherein first portions of respective gate electrodes of all transistors of a plurality of scan units in a same stage respectively from the plurality of scan circuits are connected to a same power supply signal line.

15. The array substrate of claim 10, further comprising a plurality of unitary structures commonly connected to a single third power supply line in a peripheral area of the array substrate;

wherein a respective unitary structure of the plurality of unitary structures comprises first portions of respective gate electrodes of transistors of a plurality of scan units in a same respective stage respectively from the plurality of scan circuits.

16. The array substrate of claim 10, further comprising a plurality of unitary structures commonly connected to a single third power supply line in a peripheral area of the array substrate;

wherein a respective unitary structure of the plurality of unitary structures comprises first portions of gate electrodes of second transistors, fourth transistors, fifth transistors, sixth transistors, seventh transistors, eighth transistors, ninth transistors, and tenth transistors of a plurality of scan units in a same stage respectively from the plurality of scan circuits.

17. A display apparatus comprising a scan circuit, wherein the scan circuit includes a plurality of scan units;

wherein a respective scan unit of the plurality of scan units comprises a plurality of transistors;

a respective gate electrode of a respective transistor of the plurality of transistors comprises a first portion and a second portion in different layers;

first portions of respective gate electrodes of the plurality of transistors in the respective scan unit are configured to be provided with a power supply signal;

second portions of the respective gate electrodes of the plurality of transistors in the respective scan unit are configured to be provided with gate scanning signals, respectively; and first portions of gate electrodes of at least two transistors in the respective scan unit are parts of a unitary structure;

multiple power supply lines, wherein a first power supply line of the multiple power supply lines is configured to provide a power supply signal to a first portion of a gate electrode of at least one transistor in the respective scan unit;

a second power supply line of the multiple power supply lines is configured to provide a power supply signal to first portion of gate electrodes of a group of transistors in the respective scan unit;

a third power supply line, a fourth power supply line, and a fifth power supply line;

wherein the fourth power supply line is connected to, and configured to provide a power supply signal to, a first portion of a gate electrode of a first transistor in the respective scan unit, wherein the fifth power supply line is connected to, and configured to provide a power supply signal to, a first portion of a gate electrode of a third transistor in the respective scan unit, and wherein the third power supply line is connected to, and configured to provide a power supply signal to, a unitary structure comprising first portions of gate electrode of transistors other than the first transistor and the third transistor in the respective scan unit.

* * * * *